United States Patent
Cho

(10) Patent No.: US 12,504,647 B2
(45) Date of Patent: Dec. 23, 2025

(54) SENSITIVITY EVALUATION METHOD, OPHTHALMIC LENS DESIGN METHOD, OPHTHALMIC LENS MANUFACTURING METHOD, OPHTHALMIC LENS, OPHTHALMIC LENS ORDERING DEVICE, OPHTHALMIC LENS ORDER RECEIVING DEVICE, AND OPHTHALMIC LENS ORDER RECEIVING/ORDERING SYSTEM

(71) Applicant: NIKON-ESSILOR CO., LTD., Tokyo (JP)

(72) Inventor: Sungjin Cho, Kawasaki (JP)

(73) Assignee: NIKON-ESSILOR CO., LTD., Tokyo (JP)

( * ) Notice: Subject to any disclaimer, the term of this patent is extended or adjusted under 35 U.S.C. 154(b) by 696 days.

(21) Appl. No.: 17/867,021

(22) Filed: Jul. 18, 2022

(65) Prior Publication Data

US 2022/0350162 A1 Nov. 3, 2022

Related U.S. Application Data

(63) Continuation of application No. PCT/JP2020/004521, filed on Feb. 6, 2020.

(51) Int. Cl.
*G02C 7/02* (2006.01)
*G02C 7/06* (2006.01)

(52) U.S. Cl.
CPC ............. *G02C 7/027* (2013.01); *G02C 7/028* (2013.01); *G02C 7/061* (2013.01)

(58) Field of Classification Search
CPC ........ G02C 7/027; G02C 7/028; G02C 7/061; G02C 7/06; G02C 7/25; G02C 7/24; G02C 7/22; G02C 7/66; G02C 2202/24
USPC ...................................... 351/159.42
See application file for complete search history.

(56) References Cited

U.S. PATENT DOCUMENTS

| 2006/0152675 | A1* | 7/2006 | Toshima | A61B 3/032 351/205 |
| 2012/0081661 | A1* | 4/2012 | Yamakaji | G02C 7/061 351/159.01 |
| 2012/0092614 | A1* | 4/2012 | Drobe | G02C 7/024 351/159.77 |
| 2019/0271859 | A1 | 9/2019 | Cho | |

FOREIGN PATENT DOCUMENTS

| CN | 110050225 A | 7/2019 |
| KR | 10-2019-0068624 | 6/2019 |
| WO | WO2018/101015 A1 | 6/2018 |

OTHER PUBLICATIONS

International Search Report, dated Apr. 14, 2020, in counterpart International Application No. PCT/JP2020/004521.
Written Opinion, dated Apr. 14, 2020, in counterpart International Application No. PCT/JP2020/004521.

(Continued)

*Primary Examiner* — Travis S Fissel

(57) ABSTRACT

A sensitivity evaluation method includes: causing a wearer to view a target through a lens or a lens group capable of controlling at least one optical property among a spherical power, a cylindrical power, and an astigmatic axis angle; and acquiring information about a sensitivity of the wearer with respect to an aberration.

17 Claims, 14 Drawing Sheets

(56) References Cited

OTHER PUBLICATIONS

Japanese Office Action dated Mar. 7, 2023 for Japanese Patent Application No. 2021-575180.
Korean Office Action dated Mar. 29, 2024 for Korean Application No. 10-2022-7026215.
Chinese Office Action dated Aug. 17, 2023 for Chinese Application No. 202080094937.3.
Canadian Office Action dated Aug. 24, 2023 for Canadian Application No. 3,168,630.
Extended European Search Report dated Oct. 13, 2023 for European Application No. 20917361.6.
Japanese Office Action dated Jul. 25, 2023 for Japanese Application No. 2021-575180.
Office Action issued Sep. 17, 2025 for Application No. 20 917 361.6.

* cited by examiner

[LENS INFORMATION] — 101

| | PRODUCT NAME | S POWER | C POWER | AXIS DEGREE | ADDITION DEGREE |
|---|---|---|---|---|---|
| RIGHT | LENS A | -2.25 | -0.25 | 90 | 2.00 |
| LEFT | LENS A | -2.25 | -0.25 | 90 | 2.00 |

[PROCESSING DESIGNATION INFORMATION] — 102

| | PROCESSING DESIGNATION |
|---|---|
| RIGHT | OUTER DIAMETER 60 |
| LEFT | OUTER DIAMETER 60 |

[DYEING INFORMATION] — 103

| DYEING COLOR | WAY OF DYEING | CONCENTRATION |
|---|---|---|
| COLOR A | HALF | 15% |

[FITTING POINT INFORMATION] — 104

| | PD | FP |
|---|---|---|
| RIGHT | 32.5 | 2 |
| LEFT | 32.5 | 2 |

[SENSITIVITY INFORMATION] — 106

| | ABERRATION SENSITIVITY |
|---|---|
| FAR DISTANCE | 5 |
| NEAR DISTANCE | 4 |

[FRAME INFORMATION] — 105

| MODEL NAME | FRAME TYPE | FRAME PD |
|---|---|---|
| | | |

FIG. 8

TABLE A

| STAGE (UPPER COLUMN) AND RANGE (LOWER COLUMN) OF MAXIMUM CYLINDRICAL POWER Cm | 1 | 2 | 3 | 4 | 5 |
|---|---|---|---|---|---|
| | $0 < Cm \leqq 0.1$ | $0.1 < Cm \leqq 0.2$ | $0.2 < Cm \leqq 0.3$ | $0.3 < Cm \leqq 0.4$ | $0.4 < Cm \leqq 0.5$ |
| ABERRATION SENSITIVITY EVALUATION VALUE | 10 | 9 | 8 | 7 | 6 |

| STAGE (UPPER COLUMN) AND RANGE (LOWER COLUMN) OF MAXIMUM CYLINDRICAL POWER Cm | 6 | 7 | 8 | 9 | 10 |
|---|---|---|---|---|---|
| | $0.5 < Cm \leqq 0.6$ | $0.6 < Cm \leqq 0.7$ | $0.7 < Cm \leqq 0.8$ | $0.8 < Cm \leqq 0.9$ | $0.9 < Cm \leqq 1.0$ |
| ABERRATION SENSITIVITY EVALUATION VALUE | 5 | 4 | 3 | 2 | 1 |

FIG. 13
(A)
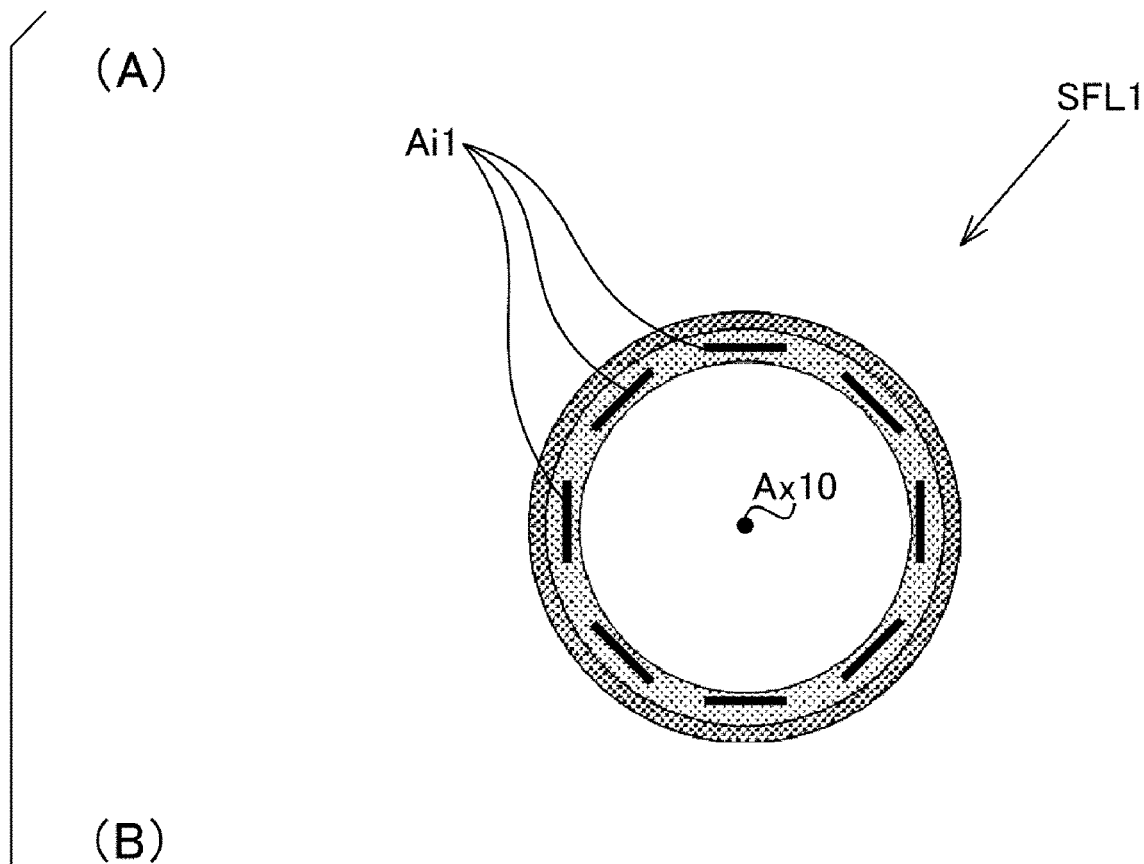
(B)
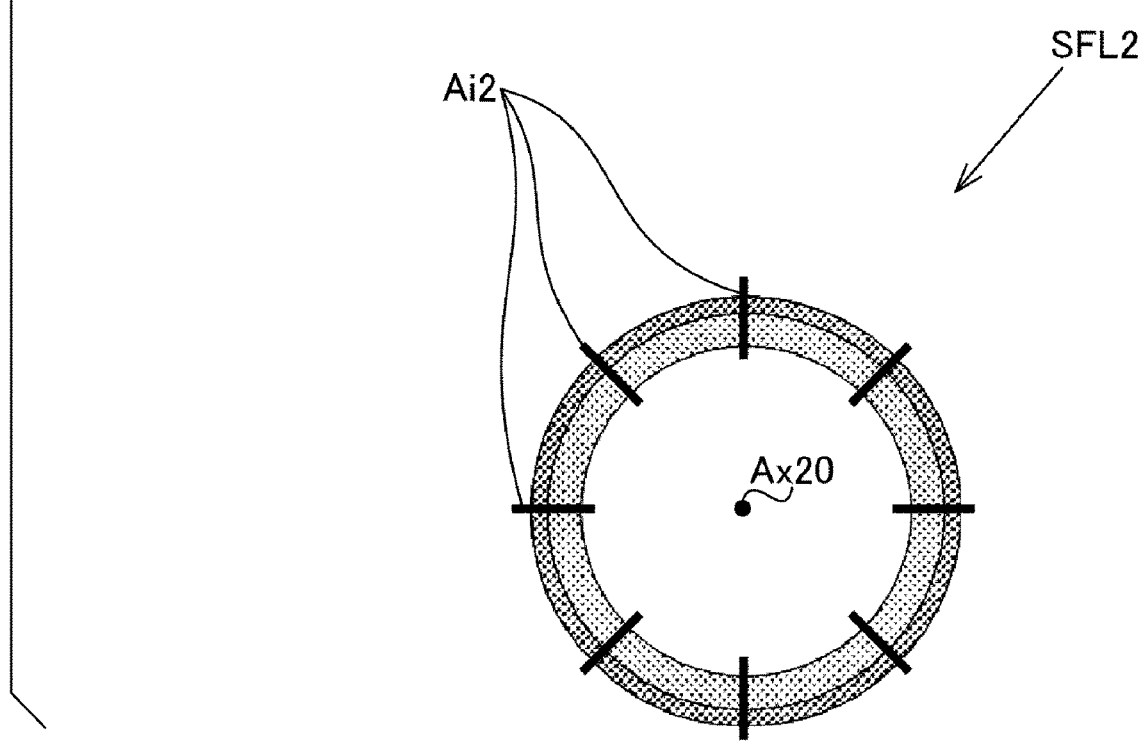

SENSITIVITY EVALUATION METHOD, OPHTHALMIC LENS DESIGN METHOD, OPHTHALMIC LENS MANUFACTURING METHOD, OPHTHALMIC LENS, OPHTHALMIC LENS ORDERING DEVICE, OPHTHALMIC LENS ORDER RECEIVING DEVICE, AND OPHTHALMIC LENS ORDER RECEIVING/ORDERING SYSTEM

CROSS-REFERENCE TO RELATED APPLICATION

This is a Continuation Application of International Application No. PCT/JP2020/004521, filed on Feb. 6, 2020. The contents of the aforementioned application are incorporated herein by reference.

BACKGROUND

Field of the Invention

The present invention relates to a sensitivity evaluation method, an ophthalmic lens design method, an ophthalmic lens manufacturing method, an ophthalmic lens, an ophthalmic lens ordering device, an ophthalmic lens order receiving device, and an ophthalmic lens order receiving/ordering system.

Background

Various design methods have been proposed for realizing an ophthalmic lens that is compatible with the characteristics of an individual wearer. For example, in PCT International Publication No. WO 2018/101015, a wearer is made to view a blurred image, and information about the sensitivity of the wearer with respect to the blurring is acquired.

SUMMARY

According to a first aspect of the present invention, a sensitivity evaluation method includes: causing a wearer to view a target through a lens or a lens group capable of controlling at least one optical property among a spherical power, a cylindrical power, and an astigmatic axis angle; and acquiring information about a sensitivity of the wearer with respect to an aberration.

According to a second aspect of the present invention, an ophthalmic lens design method includes: designing an ophthalmic lens based on the information about the sensitivity of the wearer with respect to the aberration, the information being acquired by the sensitivity evaluation method according to the first aspect.

According to a third aspect of the present invention, an ophthalmic lens manufacturing method includes: manufacturing an ophthalmic lens designed by the ophthalmic lens design method according to the second aspect.

According to a fourth aspect of the present invention, an ophthalmic lens is designed by the ophthalmic lens design method according to the second aspect.

According to a fifth aspect of the present invention, an ophthalmic lens ordering device includes: an input unit that inputs information about a sensitivity of a wearer with respect to an aberration, the information being acquired by causing the wearer to view a target through a lens or a lens group capable of controlling at least one optical property among a spherical power, a cylindrical power, and an astigmatic axis angle; and a transmission unit that transmits the information input via the input unit or a design parameter calculated based on the information to an ophthalmic lens order receiving device.

According to a sixth aspect of the present invention, an ophthalmic lens order receiving device includes: a reception unit that receives information about a sensitivity of a wearer with respect to an aberration, the information being acquired by causing the wearer to view a target through a lens or a lens group capable of controlling at least one optical property among a spherical power, a cylindrical power, and an astigmatic axis angle, or a design parameter calculated based on the information; and a design unit that designs an ophthalmic lens based on the information or the design parameter.

According to a seventh aspect of the present invention, an ophthalmic lens order receiving/ordering system includes: the ophthalmic lens ordering device according to the fifth aspect; and the ophthalmic lens order receiving device according to the sixth aspect.

BRIEF DESCRIPTION OF THE DRAWINGS

FIG. 7 is a diagram showing an example of an ordering screen.

FIG. 8 is a table showing a stage corresponding to each range of an effective cylindrical power C1 and an aberration sensitivity evaluation value.

FIG. 12A is an example in which the astigmatism is emphasized, FIG. 12B is an example in which the balance between the spherical power error and the astigmatism is set to be in a medium degree, and FIG. 12C is an example in which the spherical power is emphasized.

FIGS. 13, (A) and (B) are conceptual diagrams showing a direction of an axis of astigmatism in the single-focus lens.

DESCRIPTION OF EMBODIMENTS

Hereinafter, an ophthalmic lens design method, a sensitivity evaluation method, an ophthalmic lens manufacturing method, an ophthalmic lens, an ophthalmic lens ordering device, an ophthalmic lens order receiving device, an ophthalmic lens order receiving/ordering system, and the like of an embodiment will be described with reference to the drawings as appropriate. In the following description, it is assumed that the unit of refractive power is represented by diopters (D) unless otherwise specified. Further, in the following description, when an "upper side," a "lower side," an "upper portion," a "lower portion" or the like of the ophthalmic lens is represented, it is based on a positional relationship of the lens when the ophthalmic lens is worn.

Figure 1:
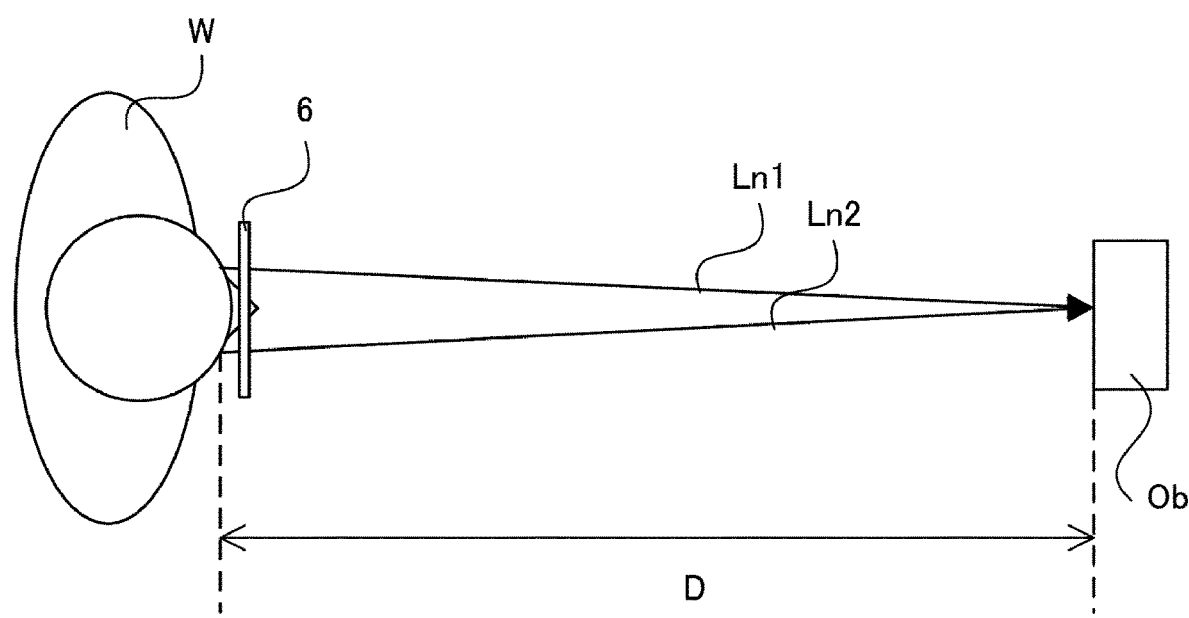
FIG. 1 is a conceptual diagram showing a form of a test in a sensitivity evaluation method according to an embodiment.

FIG. 1 is a diagram showing a form of an aberration sensitivity test performed with respect to a wearer W of an ophthalmic lens to be designed in a sensitivity evaluation method according to an ophthalmic lens design method of the present embodiment. In the aberration sensitivity test, the sensitivity of the wearer W with respect to the visual aberration, particularly the sensitivity with respect to blurring in the field of view of the wearer W is tested. The sensitivity with respect to aberration is referred to as an aberration sensitivity. In the following embodiments, the aberration sensitivity is caused by the change in a spherical power, a cylindrical power, or an astigmatic axis angle of an eye optical system and an optical system arranged between a visual target and the eye. The aberration sensitivity is an ability of sensing or a tendency of perceiving the change or an impression of blurring or the like of the visual object. The aberration sensitivity can be indicated, for example, by using the degree of blurring that can be accepted by the wearer W who views a target Ob, the degree of blurring that can be viewed without a feeling of discomfort, or the like and, in particular, can be represented as a numerical value by the degree of the maximum aberration in a case where the wearer W can accept the aberration or can view the aberration without the feeling of discomfort. In the following embodiments, the "aberration" includes a spherical power error in addition to astigmatism or the like. In the present embodiment, the aberration sensitivity test is performed using a reflector 6.

In an optician's store, an inspector who performs the aberration sensitivity test asks the wearer W to view the target Ob presented at a predetermined distance D from the wearer W through the reflector 6. In FIG. 1, as an example of viewing the target Ob with both eyes, a visual line Ln1 from the left eye and a visual line Ln2 from the right eye of the wearer W who views the target Ob are shown. A distance D is not particularly limited, and the aberration sensitivity test can be performed with respect to a distance selected from at least one of a far distance, an intermediate distance, and a near distance. In the following embodiments, the distances corresponding to the far distance, the intermediate distance, and the near distance vary depending on the country/region, the application of the ophthalmic lens, or the like and are not particularly limited; however, for example, the far distance is 1 m or more, the intermediate distance is 50 cm or more to less than 1 m, and the near distance is 25 cm or more to less than 50 cm.

The aberration sensitivity test can be performed not only in the optician's store but also at any location.

The type of ophthalmic lens designed by the ophthalmic lens design method of the present embodiment is not particularly limited; however, an example of designing a progressive refractive power lens will be described below. The progressive refractive power lens is an ophthalmic lens which includes a far portion, a near portion, and an intermediate portion that connects the far portion and the near portion such that the refractive index is continuously changed and in which the far portion is arranged above the intermediate portion and the near portion is arranged below the intermediate portion. In the design of a progressive refractive power lens that includes a far portion having a refractive power corresponding to the far distance and a near portion having a refractive power corresponding to the near distance, it is preferable to perform an aberration sensitivity test in the far distance and the near distance with respect to the wearer W. In the design of a progressive refractive power lens that includes a far portion having a refractive power corresponding to the intermediate distance and a near portion having a refractive power corresponding to the near distance, it is preferable to perform an aberration sensitivity test in the intermediate distance and the near distance with respect to the wearer W. In the design of the progressive refractive power lens, it is preferable that information obtained by the aberration sensitivity test with respect to the far distance or the intermediate distance be used in the design of the far portion, and it is preferable that information obtained by the aberration sensitivity test with respect to the near distance be used in the design of the near portion. However, the embodiment is not limited thereto, and the information obtained by the aberration sensitivity test with respect to any distance can be used in the design of any region of the far portion, the near portion, or the intermediate portion.

The target Ob is not particularly limited if the target Ob is visually recognizable; however, it is preferable that the target Ob be an object viewed at a position by a distance D away from the wearer W in daily life. The target Ob can be an image, a video, a vision test table, a letter, a text, a symbol, a graphic, a scene, or the like. The target Ob can be displayed on a personal computer (hereinafter, referred to as a PC), a mobile phone such as a smartphone, a tablet, or the like and be recognized by the wearer W, or can be recognized by way of printed material such as a magazine, a book, or a newspaper. The target Ob and the display means thereof can be changed depending on the distance D.

In the aberration sensitivity test, the aberration when the wearer W views the target Ob, particularly the degree of blurring, is changed by the reflector 6. As the reflector 6, for example, a reflector described in PCT International Publication No. WO 2015/155458 can be used.

Figure 2:
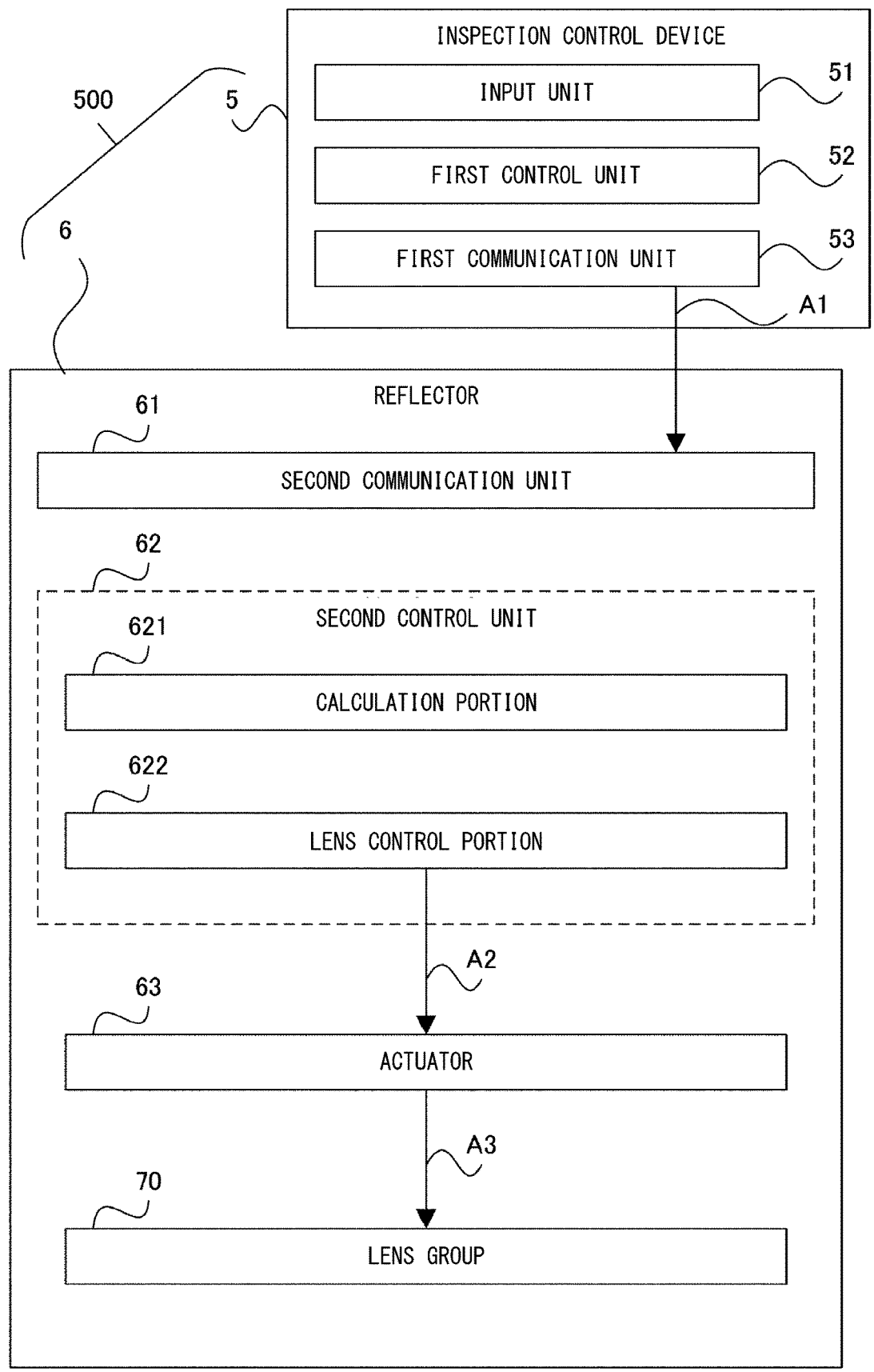
FIG. 2 is a conceptual diagram showing a configuration of a reflector according to the sensitivity evaluation method according to the embodiment.

FIG. 2 is a conceptual diagram showing a configuration of an inspection system 500. The inspection system 500 includes an inspection control device 5 and a reflector 6. The inspection control device 5 includes an input unit 51, a first control unit 52, and a first communication unit 53. The reflector 6 includes a second communication unit 61, a second control unit 62, an actuator 63, and a lens group 70. The second control unit 62 includes a calculation portion 621 and a lens control portion 622.

The inspection control device 5 includes a computer such as a PC. The inspection control device 5 communicates with the reflector 6 at the time of the aberration sensitivity test and controls an optical property of the lens group 70. The optical property of the lens group 70 controlled by the inspection control device 5 can include at least one of a spherical power, a cylindrical power, and an astigmatic axis angle. Hereinafter, an example will be described in which the inspection control device 5 mainly adjusts the spherical power, the cylindrical power, and the astigmatic axis angle of the entire lens group 70.

The input unit 51 of the inspection control device 5 includes an input device such as a mouse, a keyboard, or a touch panel. The input unit 51 receives an input from the inspector. Data that describes how the optical property set in the lens group 70 is changed is referred to as protocol data. For example, the protocol data is stored in a storage medium (not shown) in the inspection control device 5. The inspector can set how the optical property set in the lens group 70 is changed by inputting a set value of the optical property or selecting a protocol prepared in advance based on the protocol data via the input unit 51.

The first control unit 52 of the inspection control device 5 includes a CPU and a memory and controls an operation of the inspection control device 5 by reading a program stored in the storage medium (not shown) into the memory and executing the program. The first control unit 52 executes a program for the aberration sensitivity test and creates information for controlling the optical property of the lens group 70 based on the input from the inspector, the protocol data stored in the storage medium (not shown) in advance, or the like. This information is referred to as control information. The first control unit 52 transmits the control information to the reflector 6 through the first communication unit 53 (an arrow A1). For example, the first control unit 52 can determine a value (effective spherical power described later or the like) of the optical property realized by the lens group 70 and an order in which the optical property of each value is realized and transmit the determined value of the optical property to the reflector 6 through the first communication unit 53.

The first communication unit 53 of the inspection control device 5 includes a communication device which can perform a wireless communication such as a wireless LAN (Local Area Network) or an infrared communication. The first communication unit 53 transmits the control information to the second communication unit 61 of the reflector 6. The first communication unit 53 can transmit, for example, the values of optical properties such as the spherical power, the cylindrical power, and the astigmatic axis angle realized by the lens group 70 to the second communication unit 61.

As a preferred example, when starting an aberration sensitivity test with respect to a distance D, the examiner first sets the optical properties of the lens group 70 such as the spherical power, the cylindrical power, and the astigmatic axis angle such that the wearer W can clearly view the target Ob through the lens group 70. The state of the lens group 70 when the wearer W can clearly view the target Ob is referred to as a reference state. The inspector can suitably change the optical property of the lens group 70 and acquire an optical property when the wearer W answers that the wearer W can clearly see as an optical property of the reference state. In an aberration sensitivity test performed by arranging the target Ob at the far distance, an optical property of the lens group 70 in which the vision of the wearer W is completely corrected may be used as the reference state. The complete correction refers to a state in which the infinity is in focus without performing an eye adjustment. The inspector inputs the optical property of the reference state via the input unit 51.

In the following description, the astigmatic axis angle is defined as 0° in a right direction when viewing the lens group 70 from the wearer W and is defined in the counterclockwise direction from 0° to 180°, and a main meridian having a large power is defined as an astigmatic axis. The cylindrical power is presented using a negative value on the basis of the power in the astigmatic axis. A spherical power, a cylindrical power, and an astigmatic axis angle in the reference state of the lens group 70 are defined as a reference spherical power S0, a reference cylindrical power C0, and a reference astigmatic axis angle Ax0, respectively. The reference spherical power S0, the reference cylindrical power C0, and the reference astigmatic axis angle Ax0 are ordinarily matched with a spherical power, a cylindrical power, and an astigmatic axis angle in a prescription of the wearer W; however, when using a prescription which is not the complete correction, the reference spherical power S0 and the reference cylindrical power C0 may not match the spherical power and the cylindrical power in the prescription. When the examiner changes the optical property of the lens group 70, an effective spherical power S1, an effective cylindrical power C1, and an effective astigmatic axis angle Ax1 are newly added to the reference spherical power S0, the reference cylindrical power C0, and the reference astigmatic axis angle Ax0. The effective spherical power S1, the effective cylindrical power C1, and the effective astigmatic axis angle Ax1 are a spherical power, a cylindrical power, and an astigmatic axis angle, respectively, which are realized by the lens group 70 and effectively influence the vision of the wearer W in accordance with a change amount from the reference state. At this time, a spherical power, a cylindrical power, and an astigmatic axis angle set in the lens group 70 for realizing the effective spherical power S1, the effective cylindrical power C1, and the effective astigmatic axis angle Ax1 are defined as a set spherical power Ss, a set cylindrical power Cs, and a set astigmatic axis angle Axs, respectively.

The following embodiment is described using an example in which the cylindrical power is represented by a minus notation in which the main meridian having a large power is the astigmatic axis; however, a representation method of each optical property is not particularly limited. For example, the cylindrical power may be represented by a plus notation in which a main meridian having a small power is the astigmatic axis.

At this time, the set spherical power Ss, the set cylindrical power Cs, and the set astigmatic axis angle Axs can be calculated by the following equations (1), (2), and (3) using Abs ( ) as an absolute value in parentheses and sqrt ( ) as a square root in parentheses. The "*" indicates a product, but the "*" between Abs ( ) and sin ( ) or cos ( ) is omitted. In the present embodiment, this calculation is a process of the calculation portion 621. In equations (1), (2), and (3), the reference cylindrical power C0, the set cylindrical power Cs, and the effective cylindrical power C1 are represented by the minus notation.

$$\mathrm{Tan}(2*Axs)=(Abs(C0)\sin(Ax0)+Abs(C1)\sin(Ax1))/(Abs(C0)\cos(Ax0)+Abs(C1)\cos(Ax1)) \qquad (1)$$

$$Cs=-\mathrm{sqrt}((Abs(C0)\sin(Ax0)+Abs(C1)\sin(Ax1))^{\wedge}2+(Abs(C0)\cos(Ax0)+Abs(C1)\cos(Ax1))^{\wedge}2) \qquad (2)$$

$$Ss=S0+C0/2+S1+C1/2-Cs/2 \qquad (3)$$

If the set spherical power Ss, the set cylindrical power Cs, and the set astigmatic axis angle Axs can be calculated, an operation other than equations (1), (2), and (3) may be performed, and for example, an equation when each cylindrical power is represented by the plus notation may be used.

The inspector selects a protocol based on protocol data. In a protocol in which how an optical property set in the lens group 70 is changed, it is preferable that the effective astigmatic axis angle be fixed, and the effective spherical power or the effective cylindrical power be increased or decreased at a predetermined interval from the reference state. From the viewpoint of performing the aberration sensitivity test with higher accuracy, the predetermined interval is preferably less than 0.25, is more preferably less than 0.20, and even more preferably less than 0.15. When the predetermined interval is too narrow, since the aberration sensitivity test takes time, the predetermined interval can be equal to or more than 0.05 or the like, as appropriate. The range of a value of the effective spherical power or the effective cylindrical power changed from the reference state is not particularly limited but can be, for example, about 0.75 to 1.5 D at the maximum since practicality is degraded when the aberration is too strong. In the aberration sensitivity test, within such a range of the optical property, a lens group 70 in a plurality of states is realized for each predetermined interval described above.

In the protocol described above, it is preferable that the set spherical power and the set cylindrical power of the lens group 70 be changed such that an equivalent spherical power Se which is the sum (S1+C1/2) of the effective spherical power and half of the effective cylindrical power is constant. Thereby, the sensitivity of the wearer W with respect to astigmatism can be further measured with higher accuracy. For example, in the aberration sensitivity test, the first control unit 52 can communicate with the reflector 6 via the first communication unit 53 such that the effective cylindrical power C is decreased by each 0.02 D while the effective spherical power is increased by each 0.01 D. As another example, the effective spherical power and the effective cylindrical power may be exhaustively changed in a range of 0.75 D to 1.5 D from the reference state. Thereby, the sensitivity with respect to the spherical power error and the astigmatism can be measured in a wide range and with high accuracy.

The second communication unit 61 of the reflector 6 includes a communication device capable of performing a wireless communication such as a wireless LAN or infrared communication. The second communication unit 61 receives control information from the first communication unit 53 of the inspection control device 5. The second communication unit 61 can receive, for example, optical properties such as the effective spherical power, the effective cylindrical power, and the effective astigmatic axis angle realized by the lens group 70.

The first communication unit 53 and the second communication unit 61 may perform a wired communication.

The second control unit 62 of the reflector 6 includes a control device such as an electronic control panel which is a main body of each operation of the reflector 6. The second control unit 62 controls the optical property of the lens group 70 based on the control information received by the second communication unit 61.

If it is possible to control the aberration when the wearer W views the target Ob, physical configurations of the first control unit 53 and the second control unit 62 described above are not particularly limited.

The calculation portion 621 of the second control unit 62 calculates optical properties such as the set spherical power, the set cylindrical power, and the set astigmatic axis angle which are set in the lens group 70 based on the control information received by the second communication unit 61. For example, when the values of the effective spherical power, the effective cylindrical power, and the effective astigmatic axis angle are included in the control information, the calculation portion 621 can calculate the set spherical power, the set cylindrical power, and the set astigmatic axis angle using the equations (1), (2), and (3) described above.

The lens control portion 622 of the second control unit 62 controls the actuator 63 such that the spherical power, the cylindrical power, and the astigmatic axis angle of the lens group 70 become the set spherical power, the set cylindrical power, and the set astigmatic axis angle calculated by the calculation portion 621, respectively (an arrow A2).

The actuator 63 of the reflector 6 constitutes a mechanism for changing the optical property of the lens group 70 (an arrow A3). The lens group 70 is preferably capable of changing at least one of the spherical power, the cylindrical power, and the astigmatic axis angle, particularly at least one of the effective spherical power, the effective cylindrical power, and the effective astigmatic axis angle, at a predetermined interval as described above. The predetermined interval with respect to the spherical power and the cylindrical power, particularly the effective spherical power and the effective cylindrical power, is preferably less than 0.25, is more preferably less than 0.20, and even more preferably less than 0.15 from the viewpoint of being able to perform the aberration sensitivity test with higher accuracy. The predetermined interval can be equal to or more than 0.01 or the like, as appropriate. It is preferable that the lens group 70 be controlled by a program for the aberration sensitivity test stored in a storage medium (not shown) or the like of the inspection control device 5, and at least one of the spherical power, the cylindrical power, and the astigmatic axis angle be changed in an order determined by the program.

Figure 3:
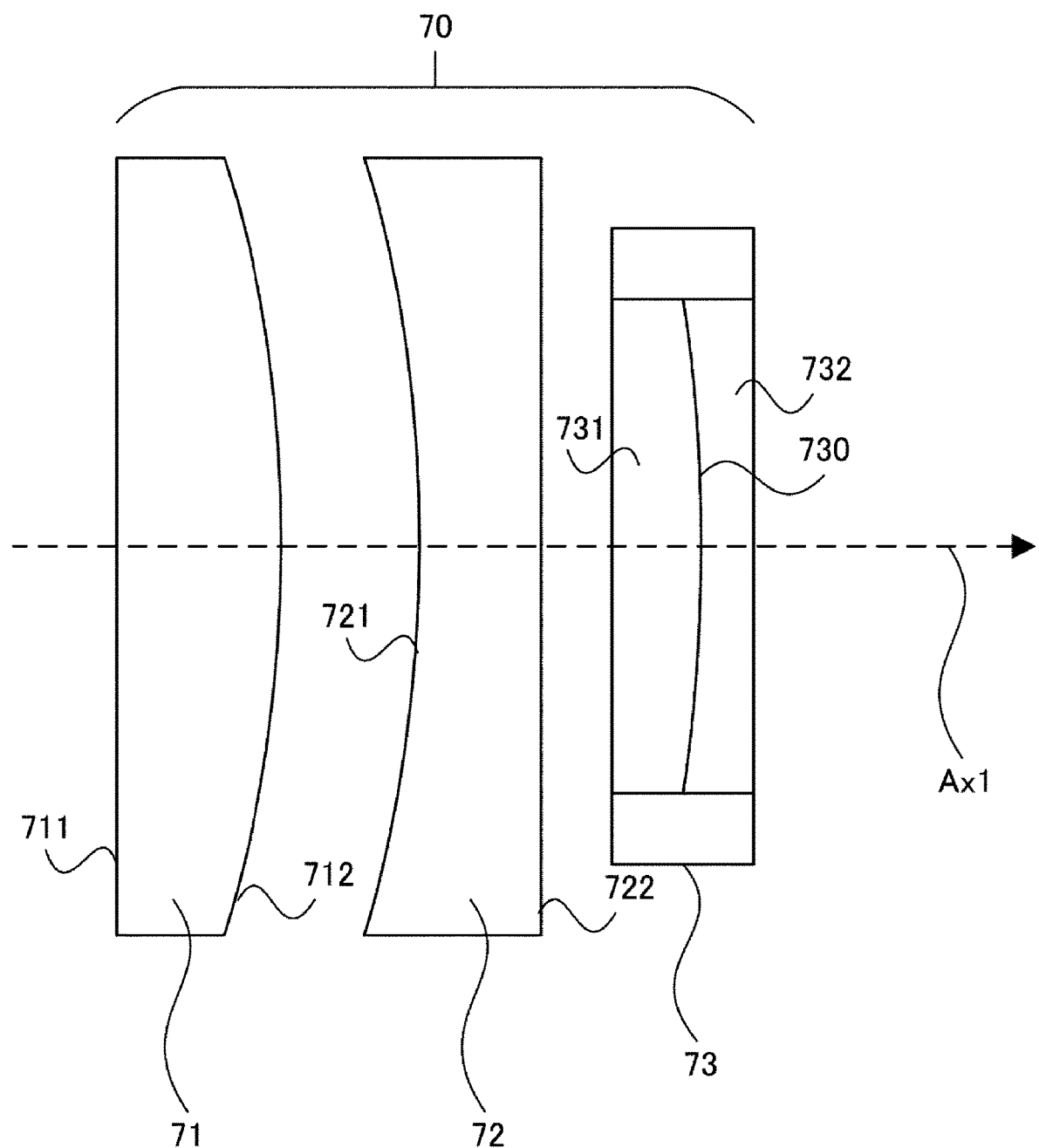
FIG. 3 is a conceptual diagram showing a lens group of a reflector.

FIG. 3 is a conceptual diagram showing the lens group 70. The lens group 70 includes a first lens 71, a second lens 72, and a third lens 73 arranged in the described order on an optical axis Ax1. The first lens 71, the second lens 72, and the third lens 73 preferably have a rotationally symmetrical optical property using the optical axis Ax1 as an axis.

The first lens 71 is a cylindrical flat convex lens and includes a first convex cylindrical surface 712 and a first flat surface 711 perpendicular to the optical axis Ax1 that is arranged on the opposite side of the first convex cylindrical surface 712. The first flat surface 711 and the first convex cylindrical surface 712 are preferably substantially rotationally symmetrical with respect to the optical axis Ax1. The first convex cylindrical surface 712 faces the second lens 72 and has a convex cylindrical shape on the second lens side. The second lens 72 is a cylindrical flat concave lens and includes a second concave cylindrical surface 721 and a second flat surface 722 perpendicular to the optical axis Ax1 that is arranged on the opposite side of the second concave cylindrical surface 721. The second concave cylindrical surface 722 faces the first lens 71 and has a concave cylindrical shape on the first lens side. The second concave cylindrical surface 721 and the second flat surface 722 are preferably substantially rotationally symmetrical with respect to the optical axis Ax1.

The first lens 71 and the second lens 72 are rotatable using the optical axis Ax1 as an axis. Any one direction perpendicular to the optical axis Ax1 is defined as a reference direction. An angle formed of the reference direction and an axis direction of the first convex cylindrical surface 712 of the first lens 71 is defined as a first lens angle a1. An angle formed of the reference direction and an axis direction of the second concave cylindrical surface 721 of the second lens 72 is defined as a second lens angle α2. The first lens angle α1 and the second lens angle α2 can be preferably changed arbitrarily by the actuator 63. For example, the actuator 63 can include a motor. In this case, as shown in the PCT International Publication No. WO 2015/155458 described above, the first lens angle α1 and the second lens angle α2 can be adjusted by transmitting the rotation of the motor through a grab screw to a gear formed on a side surface of the first lens 71 or the second lens 72 and engaged with the grab screw.

The third lens 73 is a lens having a variable spherical power. The configuration of the third lens 73 is not particularly limited if the spherical power of the third lens 73 can be changed with a desired accuracy. As an example, as shown in FIG. 3, the third lens 73 can include a first chamber 731 that accommodates a first liquid and a second chamber 732 that accommodates a second liquid having a refractive index different from the first liquid. In this case, at the boundary between the first chamber 731 and the second chamber 732, the first liquid and the second liquid are in contact with each other across a deformable film 730, and the spherical power of the third lens 73 is changed due to deformation of the film 730. The composition of the first liquid 731 and the second liquid 732 is not particularly limited if the film 730 can be deformed with a desired accuracy. As the third lens 73, for example, a lens described in the document of European Patent No. 2034338 can be used. Refer to the document for details.

The spherical power of the third lens 73 is preferably adjusted by deforming the film 730 by the actuator 63. For example, the film 730 can be deformed by moving a movable wall that supports the film 730 by the actuator 63 or by compressing a side of the film 730 that is far from the optical axis Ax1 in a direction (in the optical axis Ax1 direction) perpendicular to the surface. This compression can also be caused by a magnetic force by a current flowing through electrodes (not shown) arranged on both sides of the film 730.

The absolute value of the cylindrical power of the first lens 71 is preferably substantially equal to the absolute value of the cylindrical power of the second lens 72. In this case, the lens group 70 can be controlled to have the set spherical power, the set cylindrical power, and the set astigmatic axis angle according to equations 1 to 3 or equations 4 to 6 of the PCT International Publication No. WO 2015/155458. At least one of the spherical power, the cylindrical power, and the astigmatic axis power of the lens group 70 can be preferably changed arbitrarily by an electric control or a mechanical control as described above.

Any device other than the refractor capable of controlling the optical property of the lens group 70 can be used for the aberration sensitivity test if the device includes the lens group 70 and can change the aberration when the wearer W views the target Ob. Further, the configuration of the lens group 70 is not particularly limited if it is possible to change the aberration when the wearer W views the target Ob, and a single lens may be used instead of the lens group 70. Further, the method of the present embodiment is not limited in that all of the spherical power, the cylindrical power, and the astigmatic axis angle of the lens group 70 are controllable, and at least one of the spherical power, the cylindrical power, and the astigmatic axis angle may be controllable in the lens group 70. Further, the reflector 6 may include a camera that measures the face of the wearer W, and the first control unit 52 or the second control unit 62 may calculate a corneal vertex distance from an image obtained by imaging of the camera and modify the optical property of the lens group 70 based on the corneal vertex distance.

The inspector asks the wearer W who is viewing or has viewed the target Ob through the lens group 70 to indicate whether the aberration when viewing the target Ob, particularly the degree of blurring, is acceptable verbally or using an input device including a button or the like. In the following, the description "an answer of the wearer W" or the like refers to an answer about an impression of aberration when the wearer W views the target Ob through the lens group 70. The inspector inputs the degree of aberration sensitivity in the field of view of the wearer W to an ordering device by representing the degree using a numerical value or the like in accordance with predetermined criteria from the answer of the wearer W when viewing the target through a plurality of lens groups 70 having a different optical property.

In the following embodiment, information about aberration sensitivity of the wearer W is referred to as sensitivity information. The sensitivity information includes information indicating the sensitivity of the wearer W with respect to aberration, particularly blurring. The format and the representation method of the sensitivity information are not particularly limited if it is possible to represent the aberration sensitivity of the wearer W. For example, in the sensitivity information, the intensity of sensitivity can be represented by a numerical value or a symbol. In this case, the sensitivity may be higher when the numerical value is larger, or the sensitivity may be higher when the numerical value is smaller.

For example, when the spherical power or the cylindrical power of the lens group 70 is increased in the aberration sensitivity test, an effective spherical power or an effective cylindrical power when the wearer W answers that the power is unacceptable for the first time, or an effective spherical power or an effective cylindrical power when the wearer W answers that the power is acceptable for the last time can be the sensitivity information. Alternatively, when the spherical power or the cylindrical power of the lens group 70 is decreased in the aberration sensitivity test, an effective spherical power or an effective cylindrical power when the wearer W answers that the power is acceptable for the first time, or an effective spherical power or an effective cylindrical power when the wearer W answers that the power is unacceptable for the last time can be the sensitivity information. Information about the astigmatic axis such as an effective astigmatic axis angle at this time is also included in the sensitivity information, as appropriate.

As a further specific example, in the aberration sensitivity test, as described above, an optical property, particularly an effective spherical power or an effective cylindrical power when the effective cylindrical power is increased at an appropriate predetermined interval while fixing the effective astigmatic axis angle and the equivalent spherical power of the lens group 70, and the wearer W answers that the power is unacceptable can be the sensitivity information.

In the sensitivity evaluation method according to the present embodiment, the wearer W views the target under a condition closer to an actual situation compared to a case in which the wearer is made to view a blurred image, and the sensitivity with respect to the blurring is evaluated. Therefore, it is possible to further accurately measure the aberration sensitivity of the wearer W. For example, when viewing a target along with the astigmatism, the degree to which the wearer W performs the adjustment of the eye is different depending on the situation. More specifically, when the refractive power in the rightward-leftward direction is 2 D but the refractive power in the upward-downward direction is 2.2 D at a position where the ophthalmic lens is present, how the blurring occurs is different between a case in which the focus is adjusted by adjusting the eye on the basis of the refractive power in the rightward-leftward direction and a case in which the focus is adjusted by adjusting the eye on the basis of the refractive power in the upward-downward direction. Such an adjustment of the eye depends, for example, on a pattern of a view target. In general, the eye tends to be adjusted such that when the view target has a horizontal stripe, a line in the rightward-leftward left direction does not blur and such that when the view target has a vertical stripe, a line in the upward-downward direction does not blur. In the method of the present embodiment, the aberration sensitivity test can be performed by reflecting the influences on the adjustment of the eye that can differ depending on the target Ob or the wearer W.

In the design method of the ophthalmic lens of the present embodiment, it is possible to set a target aberration at one or more points of an ophthalmic lens to be designed or an upper limit value of acceptable aberration based on the obtained sensitivity information of the wearer W. According to this design method, an ophthalmic lens in which an optical property such as aberration when the wearer W views a target at a distance D is appropriately set is designed.

If the design of the ophthalmic lens is performed based on the sensitivity information, how the sensitivity information is used for performing the design is not particularly limited. Hereinafter, an example is described in which a progressive refractive power lens that includes a far portion having a refractive power corresponding to a far distance and a near portion having a refractive power corresponding to a near distance is designed based on the result of the aberration sensitivity test.

An ophthalmic lens order receiving/ordering system according to the design of an ophthalmic lens is described. The ophthalmic lens order receiving/ordering system according to the present embodiment can provide an ophthalmic lens in which an optical property such as aberration when the wearer W views a target at a distance D is appropriately set based on the aberration sensitivity in the field of view of the wearer W as described above.

Figure 4:
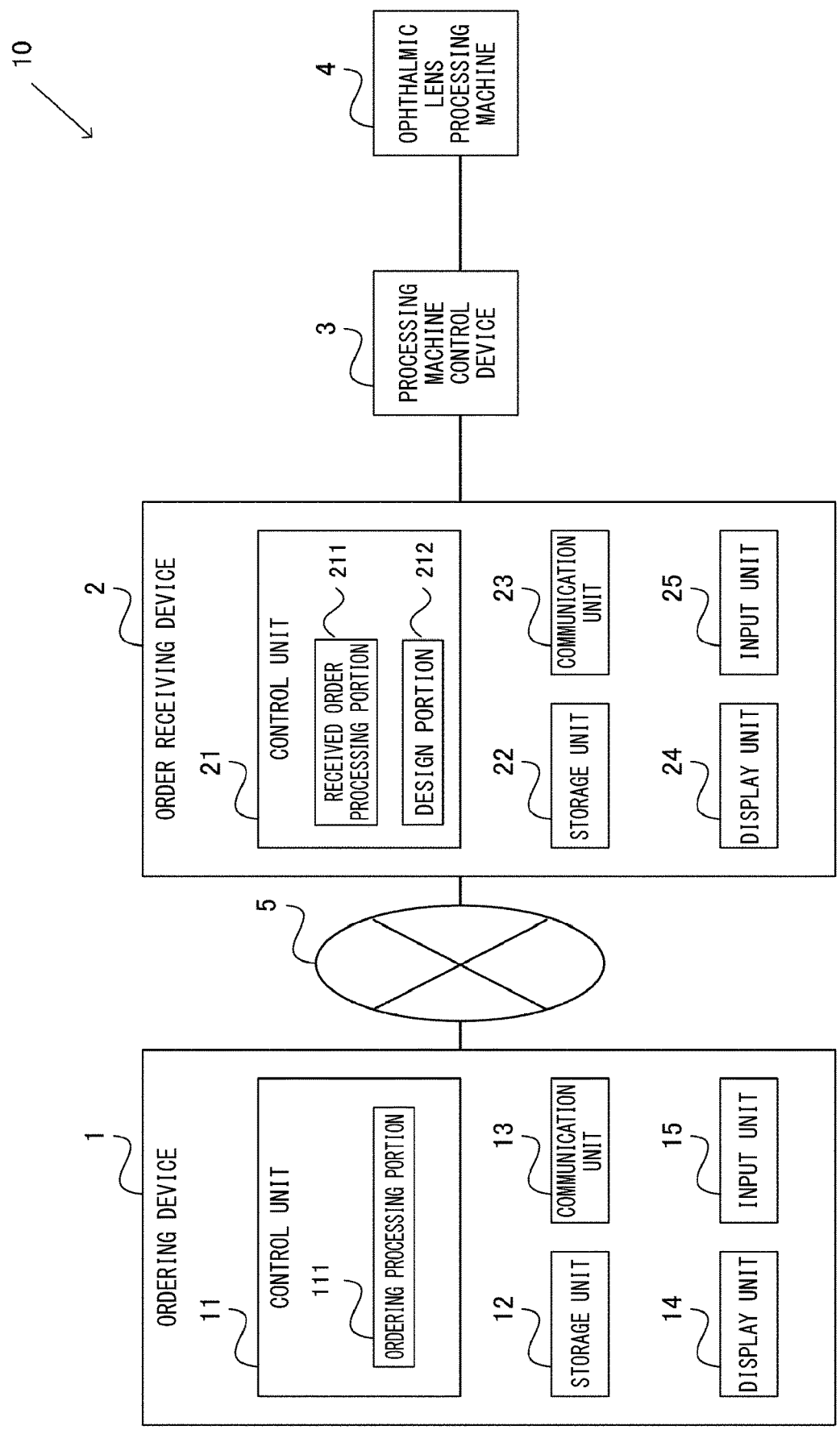
FIG. 4 is a conceptual diagram showing a configuration of an ophthalmic lens order receiving/ordering system.

FIG. 4 is a diagram showing a configuration of an ophthalmic lens order receiving/ordering system 10 according to the present embodiment. The ophthalmic lens order receiving/ordering system 10 includes an ordering device 1 that is provided in an optician's store (orderer), and an order receiving device 2, a processing machine control device 3, and an ophthalmic lens processing machine 4 that are provided at a lens manufacturer. The ordering device 1 and the order receiving device 2 are communicatively connected to each other, for example, via a network 5 such as the Internet. Further, the processing machine control device 3 is communicatively connected to the order receiving device 2, and the ophthalmic lens processing machine 4 is communicatively connected to the processing machine control device 3. In FIG. 4, only one ordering device 1 is described for convenience of illustration, but actually, a plurality of ordering devices 1 provided in a plurality of optician's stores are connected to the order receiving device 2.

The ordering device 1 is a computer that performs an ordering process of an ophthalmic lens and includes a control unit 11, a storage unit 12, a communication unit 13, a display unit 14, and an input unit 15. The control unit 11 controls the ordering device 1 by reading a program stored in the storage unit 12 into a memory (not shown) and executing the program. The control unit 11 includes an ordering processing portion 111 that performs an ordering process of the ophthalmic lens. The communication unit 13 performs communication with the order receiving device 2 via the network 5. The display unit 14 is, for example, a display device such as a liquid crystal display and displays an ordering screen or the like for inputting ordering information which is information of an ophthalmic lens to be ordered. The input unit 15 includes, for example, a mouse, a keyboard, and the like. For example, ordering information in accordance with contents of the ordering screen is input via the input unit 15.

The display unit 14 and the input unit 15 may be integrally constituted of a touch panel or the like.

The order receiving device 2 is a computer that performs an order receiving process and a design process of the ophthalmic lens, a calculation process of an optical performance, and the like and includes a control unit 21, a storage unit 22, a communication unit 23, a display unit 24, and an input unit 25. The control unit 21 controls the order receiving device 2 by reading a program stored in the storage unit 22 into a memory (not shown) and executing the program. The control unit 21 includes a received order processing portion 211 that performs an order receiving process of the ophthalmic lens and a design portion 212 that performs a design process of the ophthalmic lens. The communication unit 23 performs communication with the ordering device 1 via the network 5 and performs communication with the processing machine control device 3. The storage unit 22 stores a variety of data for designing the ophthalmic lens such that the data is readable. The display unit 24 is, for example, a display device such as a liquid crystal display and displays a design result of an ophthalmic lens and the like. The input unit 25 includes, for example, a mouse, a keyboard, and the like.

The display unit 24 and the input unit 25 may be integrally constituted of a touch panel or the like. Further, the design portion 212 may be arranged in an ophthalmic lens design device that is not integral with the order receiving device 2.

Figure 5:
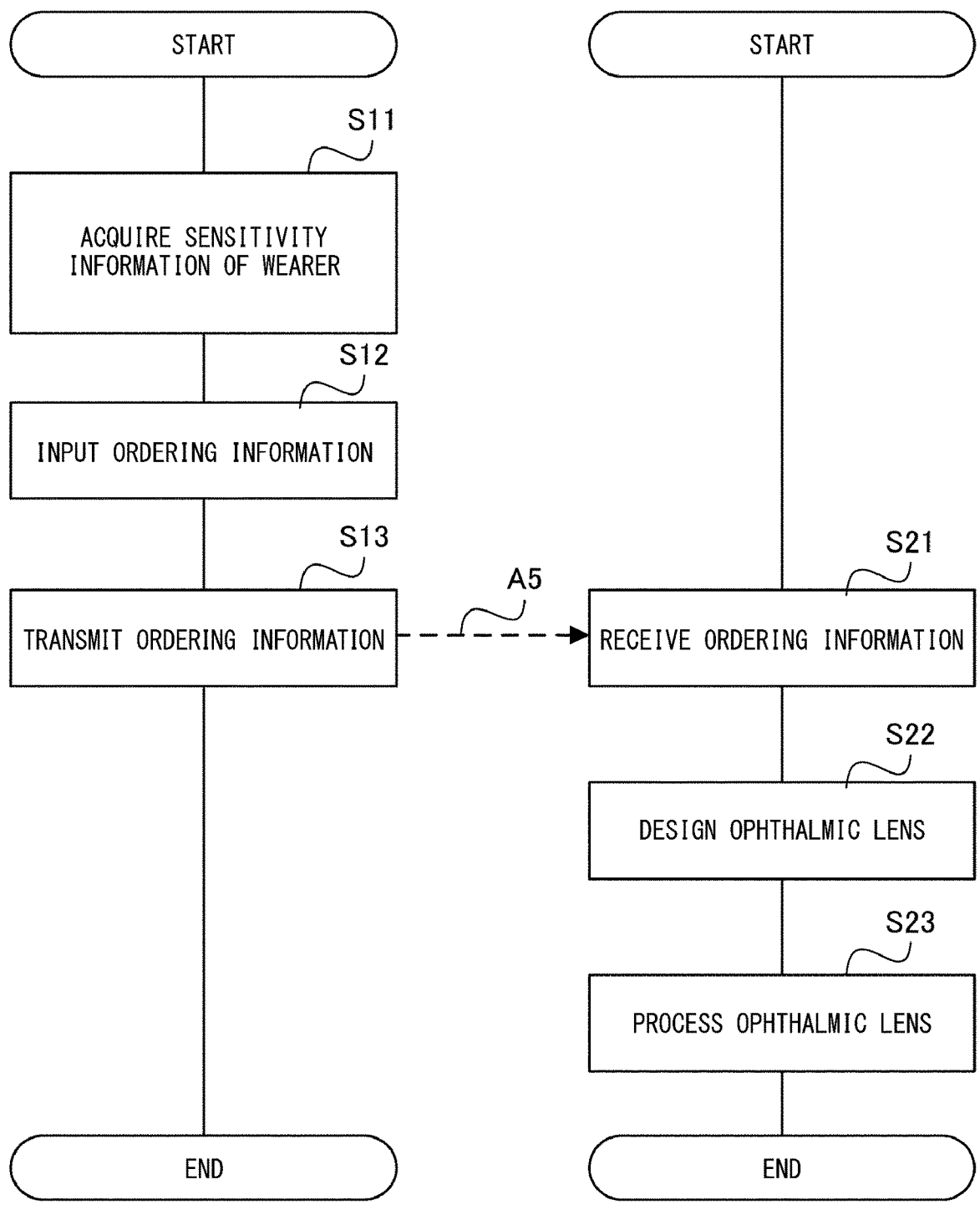
FIG. 5 is a flowchart showing a process flow of providing an ophthalmic lens in the ophthalmic lens order receiving/ordering system according to the embodiment.

Next, a procedure of providing the ophthalmic lens in the ophthalmic lens order receiving/ordering system 10 is described with reference to a flowchart shown in FIG. 5. The left side of FIG. 5 shows a procedure performed at the optician's store side, and the right side of FIG. 5 shows a procedure performed at the lens manufacturer's side. In an ophthalmic lens manufacturing method according to the present embodiment, an ophthalmic lens designed by the ophthalmic lens design method described above is manufactured.

In Step S11, the orderer or the ordering device 1 acquires sensitivity information of the wearer W.

Figure 6:
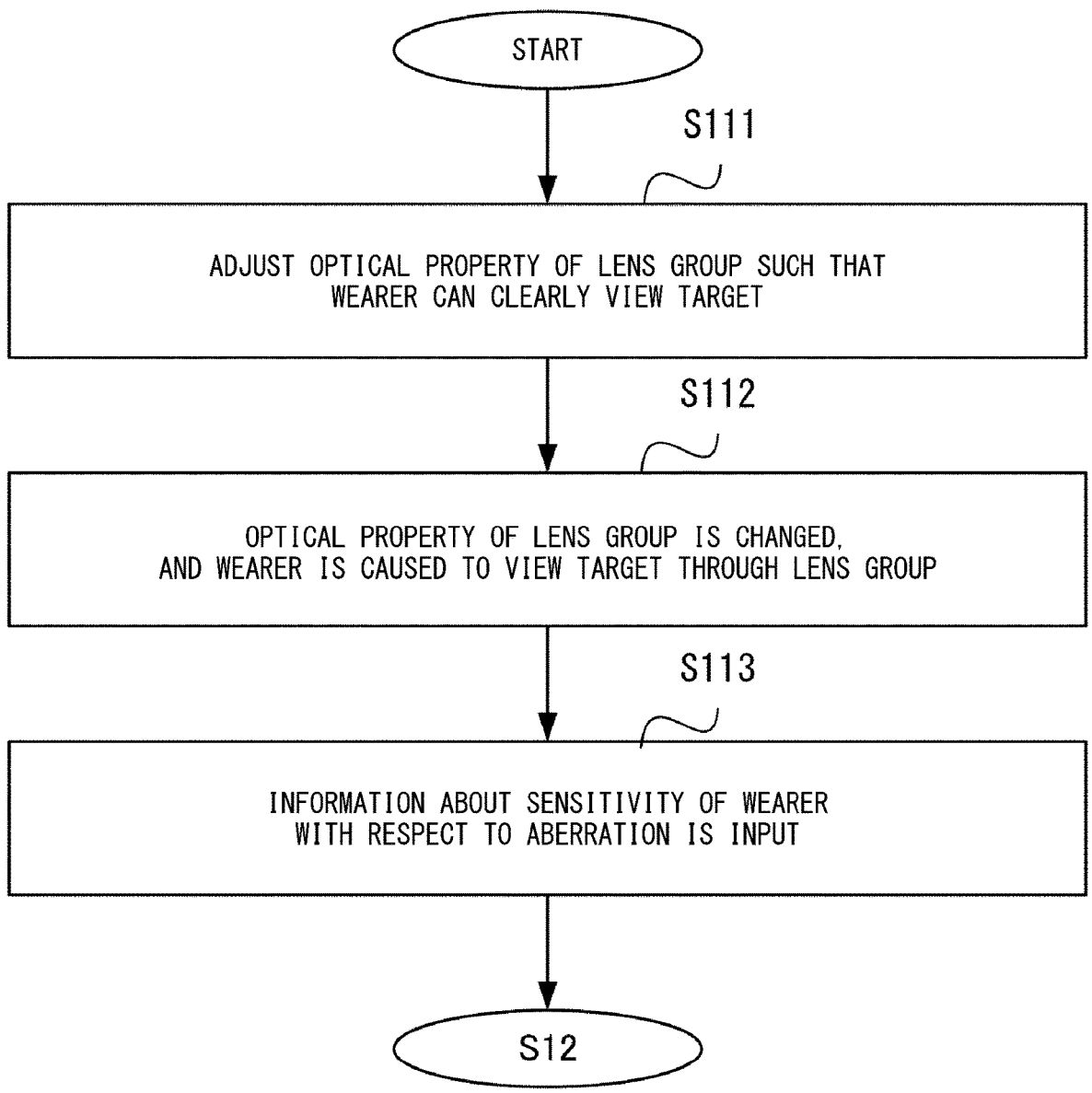
FIG. 6 is a flowchart showing a step flow of acquiring sensitivity information of a wearer according to the embodiment.

FIG. 6 is a flowchart showing Step S11 further divided in a plurality of stages. In Step S111, based on the input of the orderer, the inspection control device 5 adjusts the optical property of the lens group 70 such that the wearer W can clearly view the target Ob at a predetermined distance. The orderer inputs the optical property of the lens group 70 in the reference state to the inspection control device 5. In the present embodiment, the orderer presents a target Ob at a far distance, for example, at a distance of 2 m from the wearer W in order to make a far/near progressive refractive power lens and performs the aberration sensitivity test described above. When Step S111 is finished, Step S112 is started.

In Step S112, by a control of the inspection control device 5, the optical property of the lens group 70 is changed from the reference state, and the orderer asks the wearer W to view the target Ob through the lens group 70 having the changed optical property. For example, the inspection control device 5 performs a control such that the effective astigmatic axis angle of the lens group 70 is fixed, and the effective cylindrical power or the effective spherical power is increased from the reference state at a predetermined interval. It is preferable that the inspection control device 5 increase the cylindrical power while causing the equivalent spherical power to be constant. The orderer asks the wearer W to describe the impression when viewing the target Ob through the lens group 70. Alternatively, a configuration may be employed in which whether or not the target Ob is acceptable is input via a device such as a tablet or a smartphone including an input means. When Step S112 is finished, Step S113 is started.

In Step S113, the orderer inputs the sensitivity information to the ordering device 1. For example, when the spherical power is increased from the reference state of the lens group 70, the orderer can input the effective cylindrical power of the lens group 70 when the wearer W answers that the power is unacceptable for the first time, or the effective spherical power when the wearer W answers that the power is acceptable for the last time, as the sensitivity information, to the ordering device. When the answer from the wearer W is acquired by the input means, the ordering device 1 may acquire the answer through communication or the like, extract an effective spherical power or the like when the wearer W answers that the power is unacceptable for the first time through the processing of the control unit 11, and create the sensitivity information. When Step S113 is finished, Step S12 (FIG. 5) is started.

When the aberration sensitivity test is performed at a plurality of distances, the target Ob is arranged at each distance, and Steps S111 to S113 are performed. When making a far/near progressive refractive power lens, it is preferable to perform the aberration sensitivity test by Steps S111 to S113 with respect to a near distance, for example, a distance of 30 cm from the wearer W.

In Step S12 (FIG. 5), the orderer determines the ordering information of the ophthalmic lens to be ordered that includes the sensitivity information of the wearer W acquired in Step S113. Then, the orderer causes the display unit 14 of the ordering device 1 to display the ordering screen and inputs the ordering information through the input unit 15.

FIG. 7 is a diagram showing an example of an ordering screen 100. In a lens information item 101, a product name of the lens to be ordered and items related to a lens order power of a prescription (the spherical power (S power), the cylindrical power (C power), the astigmatic axis angle (axis degree), an addition degree, and the like) are input. A processing designation information item 102 is used when an outer diameter of the lens to be ordered is designated or when any point thickness is designated. A dyeing information item 103 is used when the color of the lens is designated. In a fitting point (FP) information item 104, an interpupillary distance (PD) with respect to the wearer W and information about a position of the FP are input. In a frame information item 105, a frame model name, a frame type, and the like are input. In a sensitivity information item 106, the sensitivity information is input.

In the example of FIG. 7, a numerical value obtained by a conversion by a predetermined method based on the answer of the wearer W in the aberration sensitivity test is used as the sensitivity information. In the example of FIG. 7, the aberration sensitivity is represented by a numerical value of 10 stages ("5" for the far distance and "4" for the near distance) for each of the far distance and the near distance. This value is referred to as an aberration sensitivity evaluation value. In the example of FIG. 7, the aberration sensitivity is defined such that the sensitivity is stronger with respect to the aberration, that is, sensitive to the aberration as the aberration sensitivity evaluation value is larger.

FIG. 8 is a diagram showing a table A showing a correspondence between the maximum effective cylindrical power and the aberration sensitivity evaluation value for which the answer of the wearer W is acceptable in the example of FIG. 7. This maximum effective cylindrical power is referred to as a maximum cylindrical power Cm. Here, the maximum value of the effective cylindrical power provided by the reflector 6 is 1.0 D, and the range of 0.0 D to 1.0 D is divided into 10 stages (upper column of table A) from 1 to 10. The aberration sensitivity evaluation value (lower column) is determined as shown in table A depending on a range (middle column of table A) corresponding to 10 stages which the maximum cylindrical power Cm for which the answer of the examinee (wearer W) is acceptable falls within. For example, a case in which the maximum effective cylindrical power for which the answer of the wearer W is acceptable in a far-distance aberration sensitivity test is 0.6 corresponds to the stage 6 and an aberration sensitivity evaluation value of 5. The way of the correspondence between the maximum cylindrical power Cm and the aberration sensitivity evaluation value is not particularly limited. As a preferred example, the maximum value of the effective cylindrical power provided by the reflector 6 can be arbitrarily determined in the range of 0.75 to 1.5 D.

In addition to the items described above, various information such as information indicating the accommodation power of the wearer Wr can be added to the ordering screen 100. Further, in addition to or instead of the sensitivity information of the wearer W, a design parameter calculated as an index indicating a range having a small astigmatism with respect to at least one of the far portion and the near portion may be input. The design parameter can be a line segment that extends in the rightward-leftward direction on the lens at the far portion or the near portion as shown by, for example, a dashed arrow or a dashed-dotted arrow of FIG. 10 described later, and the line segment can have a length in which the aberration is equal to or less than a predetermined value or the like. The design parameter is not particularly limited if the design parameter is a parameter for the design of the ophthalmic lens that is calculated or set based on the sensitivity information.

When the orderer inputs each item of the ordering screen 100 of FIG. 7 and clicks a send button (not shown), the ordering processing portion 111 of the ordering device 1 acquires the ordering information that is input in each item of the ordering screen 100, and Step S13 (FIG. 5) is started. In Step S13, the ordering device 1 transmits the ordering information to the order receiving device 2 through the communication unit 13 (an arrow A5).

In the ordering device 1, a process of displaying the ordering screen 100, a process of acquiring the ordering information that is input in the ordering screen 100, and a process of transmitting the ordering information to the ordering receiving device 2 are performed by the control unit 11 of the ordering device 1 executing a predetermined program that is installed in the storage unit 12 in advance.

In Step S21, when the received order processing portion 211 of the order receiving device 2 receives the ordering information from the ordering device 1 through the communication unit 23, Step S22 is started. In Step S22, the design portion 212 of the order receiving device 2 designs the ophthalmic lens based on the received ordering information.

Figure 9:
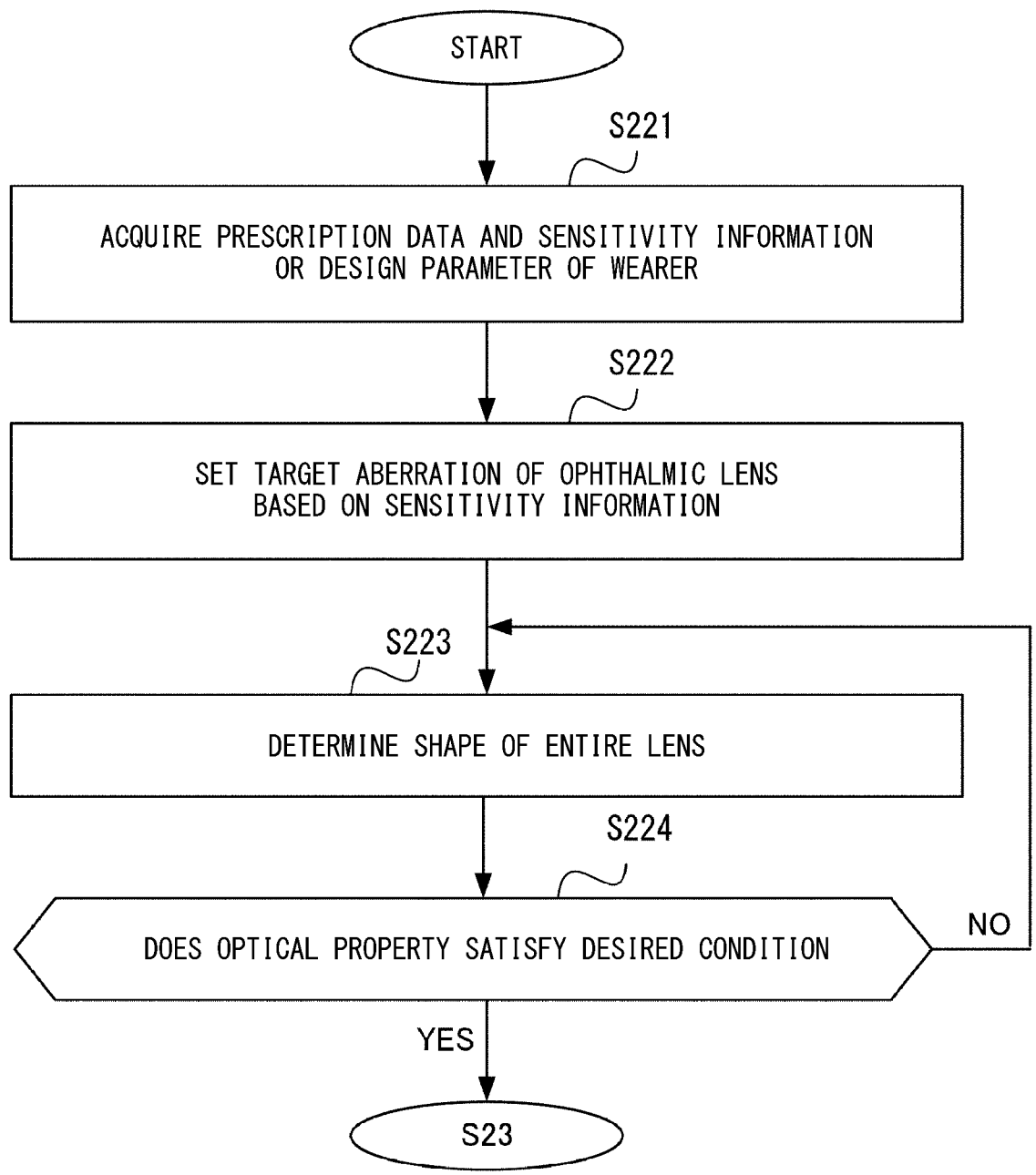
FIG. 9 is a flowchart showing a flow of an ophthalmic lens design method according to the embodiment.

FIG. 9 is a flowchart showing a procedure of designing an ophthalmic lens corresponding to Step S22. In Step S221, the order receiving device 2 acquires prescription data of the ophthalmic lens and a design parameter such as the sensitivity information of the wearer W or an index indicating a range in which the astigmatism of the far portion and/or the near portion is small. The order receiving device 2 also acquires a fitting parameter such as a forward inclination angle of a frame, a warp angle, and a distance between the eye and the lens or the like, as appropriate. When Step S221 is finished, Step S222 is started.

In Step S222, the design portion 212 of the order receiving device 2 sets a target aberration of the ophthalmic lens based on the sensitivity information or the design parameter of the wearer W acquired in Step S221.

Figure 10:
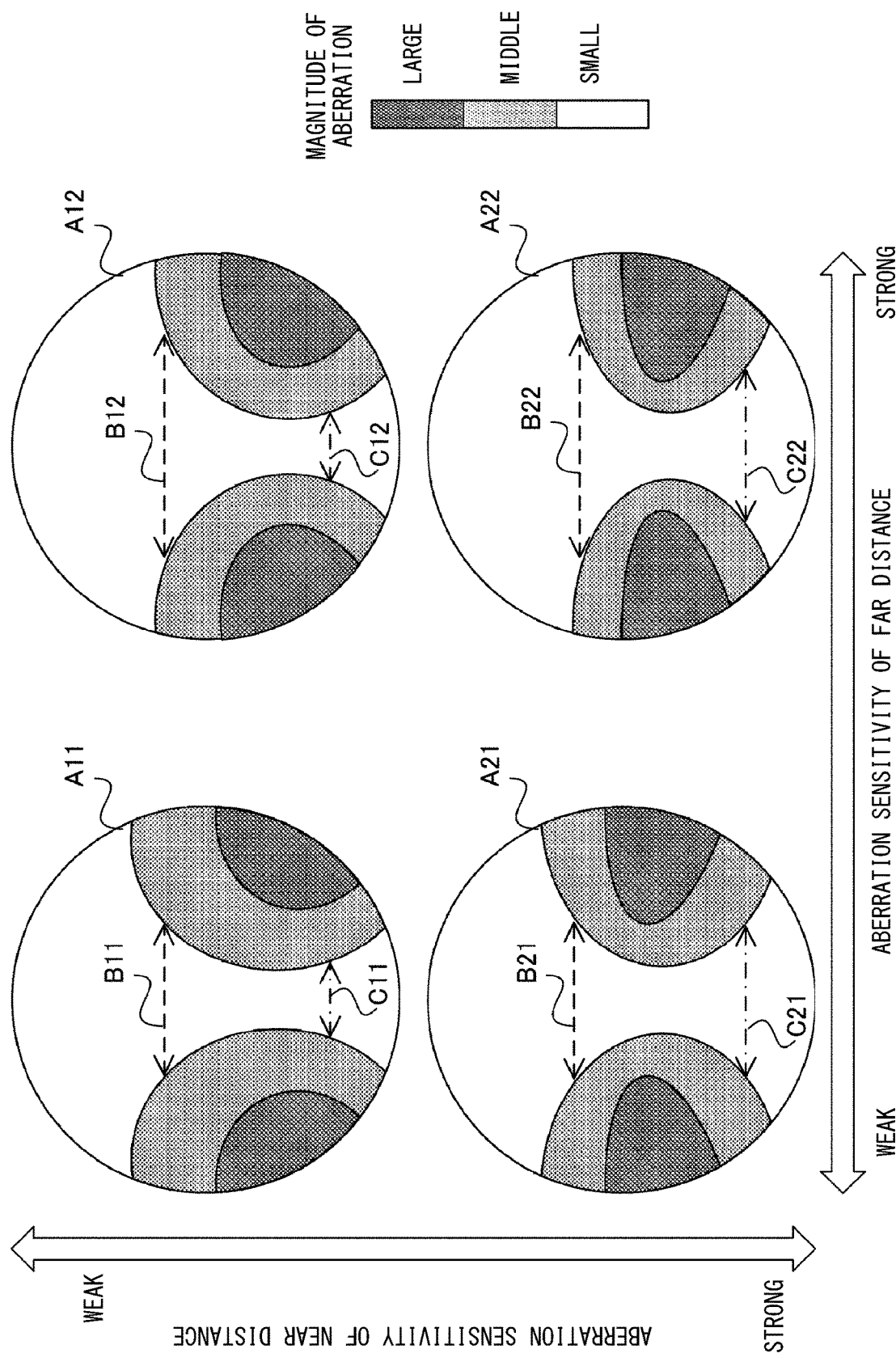
FIG. 10 is a conceptual diagram showing an example of the setting of an aberration in a progressive refractive power lens.

FIG. 10 is a conceptual diagram showing a relationship between the sensitivity information of the wearer W and the design parameter and an example of setting a target aberration based on the design parameter. Four aberration distribution diagrams A11, A12, A21, and A22 are shown in the middle of the figure, and the magnitude of aberration corresponding to a pattern used for representing the magnitude of aberration in the aberration distribution diagrams A11, A12, A21, and A22 is shown in the rightmost portion of the figure. Dashed arrows B11, B12, B21, and B22 extend in the rightward-leftward direction in the far portion and indicate a width of a portion in which the magnitude of aberration is equal to or less than a predetermined value, and the length of the dashed arrow is a design parameter as an index representing a range in which the astigmatism of the far portion is small. Dashed-dotted arrows C11, C12, C21, and C22 extend in the rightward-leftward direction in the near portion and indicate a width of a portion in which the magnitude of aberration is equal to or less than a predetermined value, and the length of the dashed-dotted arrow is a design parameter as an index representing a range in which the astigmatism of the near portion is small. The position in the upward-downward direction of the dashed arrows B11, B12, B21, and B22 and the dashed-dotted arrows C11, C12, C21, and C22 is arbitrarily set and is set, for example, on the basis of a position (far power measurement position) of a far measurement point and a position (near power measurement position) of a near measurement point.

Among the four aberration distribution diagrams A11, A12, A21, and A22 shown in FIG. 10, a left upper aberration distribution diagram A11 is a lens for a wearer W having a low sensitivity of the astigmatism of the near distance and the far distance. In the aberration distribution diagram A11, since a range in which the astigmatism is small is narrow, as indicated by the dashed arrow B11 and the dashed-dotted arrow C11, but the change of the astigmatism is small, the distortion of the contour is small. A right upper aberration distribution diagram A12 is a lens for a wearer W having a strong sensitivity of the astigmatism of the far distance compared to the case of the aberration distribution diagram A11. In the aberration distribution diagram A12, a range in which the astigmatism of the far portion is small, as indicated by the dashed arrow B12, is designed to be large compared to the case of the aberration distribution diagram A11. A left lower aberration distribution diagram A21 is a lens for a wearer W having a strong sensitivity of the astigmatism of the near distance compared to the case of the aberration distribution diagram A11. In the aberration distribution diagram A21, a range in which the astigmatism of the near portion is small, as indicated by the dashed-dotted arrow C21, is designed to be large compared to the case of the aberration distribution diagram A11. A right lower aberration distribution diagram A22 is a lens for a wearer W having a strong sensitivity of the astigmatism of the near distance and the far distance compared to the case of the aberration distribution diagram A11. In the aberration distribution diagram A22, ranges in which the astigmatisms of the far portion and the near portion are small, as indicated by the dashed arrow B22 and the dashed-dotted arrow C22, respectively, are designed to be large compared to the case of the aberration distribution diagram A11.

In Step S223 (FIG. 9), the design portion 212 of the order receiving device 2 determines the shape of the entire lens of the ophthalmic lens based on the set target aberration. When the shape of the entire lens is determined, the routine proceeds to Step S224. In Step S224, the design portion 212 determines whether the optical properties such as the refractive power and the astigmatism of the ophthalmic lens satisfy a desired condition. When the desired condition is satisfied, a positive determination is made for Step S224, the design process is finished, and the routine proceeds to Step S23 (refer to FIG. 5). When the desired condition is not satisfied, a negative determination is made for Step S224, and the routine returns to Step S223.

In Step S23, the control unit 21 of the order receiving device 2 outputs the design data of the ophthalmic lens designed in Step S22 to the processing machine control device 3. The processing machine control device 3 sends a processing instruction to the ophthalmic lens processing machine 4 based on the design data output from the order receiving device 2. As a result, the ophthalmic lens based on the design data is processed and manufactured by the ophthalmic lens processing machine 4. The ophthalmic lens manufactured by the ophthalmic lens processing machine 4 is shipped to the optician's store, is fitted into an eyeglass frame, and is provided to a customer (the wearer W).

In the order receiving device 2, a process of receiving the ordering information from the ordering device 1, a process of designing the ophthalmic lens based on the received ordering information, and a process of outputting the design data of the ophthalmic lens to the processing machine control device 3 are performed by the control unit 21 of the order receiving device 2 executing a predetermined program that is installed in the storage unit 22 in advance.

According to the above-described embodiment, the following effects are obtained.

(1) The sensitivity evaluation method according to the present embodiment includes: making the wearer W to view the target Ob through the lens group 70 capable of controlling at least one optical property among the spherical power, the cylindrical power, and the astigmatic axis angle; and acquiring information about the sensitivity of the wearer W with respect to the aberration. Thereby, it is possible to measure the sensitivity of the wearer W with respect to the aberration with high accuracy.

(2) In the sensitivity evaluation method according to the present embodiment, in the lens group 70, at least one of the spherical power, the cylindrical power, and the astigmatic axis angle can be arbitrarily changeable at a predetermined interval. Thereby, it is possible to obtain an answer about the aberration from the wearer W at each predetermined interval, and the aberration sensitivity test can be facilitated.

(3) In the sensitivity evaluation method according to the present embodiment, the lens group 70 can be controlled by a program, and at least one of the spherical power, the cylindrical power, and the astigmatic axis angle can be changed in an order determined by the program. Thereby, it is possible to reduce the time required for the aberration sensitivity test and the time required of the inspector.

(4) In the sensitivity evaluation method according to the present embodiment, the predetermined interval with respect to the spherical power and the cylindrical power is smaller than 0.25 D. Thereby, it is possible to measure the sensitivity of the wearer W with respect to the aberration with higher accuracy.

(5) In the sensitivity evaluation method according to the present embodiment, it is possible to make the wearer W to view the target Ob through the lens group in a plurality of states having an optical property of different values with reference to the optical property of the lens group 70 when the wearer W is capable of clearly viewing the target Ob through the lens group 70. Thereby, it is possible to measure the sensitivity with respect to the aberration in a practically important range on the basis of a case in which the target Ob can be clearly viewed.

(6) In the sensitivity evaluation method according to the present embodiment, the sensitivity information can be information about whether or not it is acceptable for the wearer W to view the target Ob through the lens group 70. Thereby, it is possible to accurately measure the sensitivity of the wearer W with respect to the aberration based on an actual sense of the wearer W.

(7) In the sensitivity evaluation method according to the present embodiment, in the lens group 70, at least one of the spherical power, the cylindrical power, and the astigmatic axis angle can be arbitrarily changeable by an electric control or a mechanical control. Thereby, it is possible to accurately measure the sensitivity of the wearer W with respect to the aberration without taking time.

(8) An ophthalmic lens design method of the present embodiment includes: designing an ophthalmic lens based on the information about the sensitivity of the wearer W with respect to the aberration, the information being acquired by the sensitivity evaluation method described above. Thereby, it is possible to design an ophthalmic lens suitable for the wearer W based on the sensitivity of the wearer W with respect to the aberration measured with high accuracy.

(9) An ophthalmic lens manufacturing method according to the present embodiment includes: manufacturing an ophthalmic lens designed by the ophthalmic lens design method described above. Thereby, it is possible to provide an ophthalmic lens suitable for the wearer W which is designed based on the sensitivity of the wearer W with respect to the aberration measured with high accuracy.

(10) An ophthalmic lens according to the present embodiment is an ophthalmic lens designed by the ophthalmic lens design method described above. Thereby, the wearer W can view a target object with an appropriate aberration through the ophthalmic lens.

(11) An ophthalmic lens ordering device according to the present embodiment includes: the input unit 15 that inputs the sensitivity information of the wearer W acquired by causing the wearer W to view the target Ob through the lens group 70 capable of controlling at least one optical property among the spherical power, the cylindrical power, and the astigmatic axis angle; and the transmission unit 13 that transmits the sensitivity information input via the input unit 15 or the design parameter calculated based on the sensitivity information to the ophthalmic lens order receiving device 2. Thereby, it is possible to provide an ophthalmic lens suitable for the wearer W which is designed based on the sensitivity of the wearer W with respect to the aberration measured with high accuracy.

(12) The ophthalmic lens order receiving device according to the present embodiment includes: the communication unit 23 that receives the sensitivity information of the wearer W acquired by causing the wearer W to view the target Ob through the lens group 70 capable of controlling at least one optical property among the spherical power, the cylindrical power, and the astigmatic axis angle, or the design parameter calculated based on the sensitivity information; and the design portion 212 that designs an ophthalmic lens based on the sensitivity information or the design parameter. Thereby, it is possible to provide an ophthalmic lens suitable for the wearer W which is designed based on the sensitivity of the wearer W with respect to the aberration measured with high accuracy.

(13) The ophthalmic lens order receiving/ordering system according to the present embodiment includes: the ophthalmic lens ordering device 1 described above; and the ophthalmic lens order receiving device 2 described above. Thereby, it is possible to provide an ophthalmic lens suitable for the wearer W which is designed based on the sensitivity of the wearer W with respect to the aberration measured with high accuracy.

The following modified examples are also within the scope of the present invention and can be combined with the embodiment described above.

Modified Example 1

In the embodiment described above, the astigmatic axis angle, particularly the effective astigmatic axis angle, of the lens group 70 in the aberration sensitivity test may be set based on a direction of an axis of astigmatism in a region of an ophthalmic lens to be designed.

Figure 11:
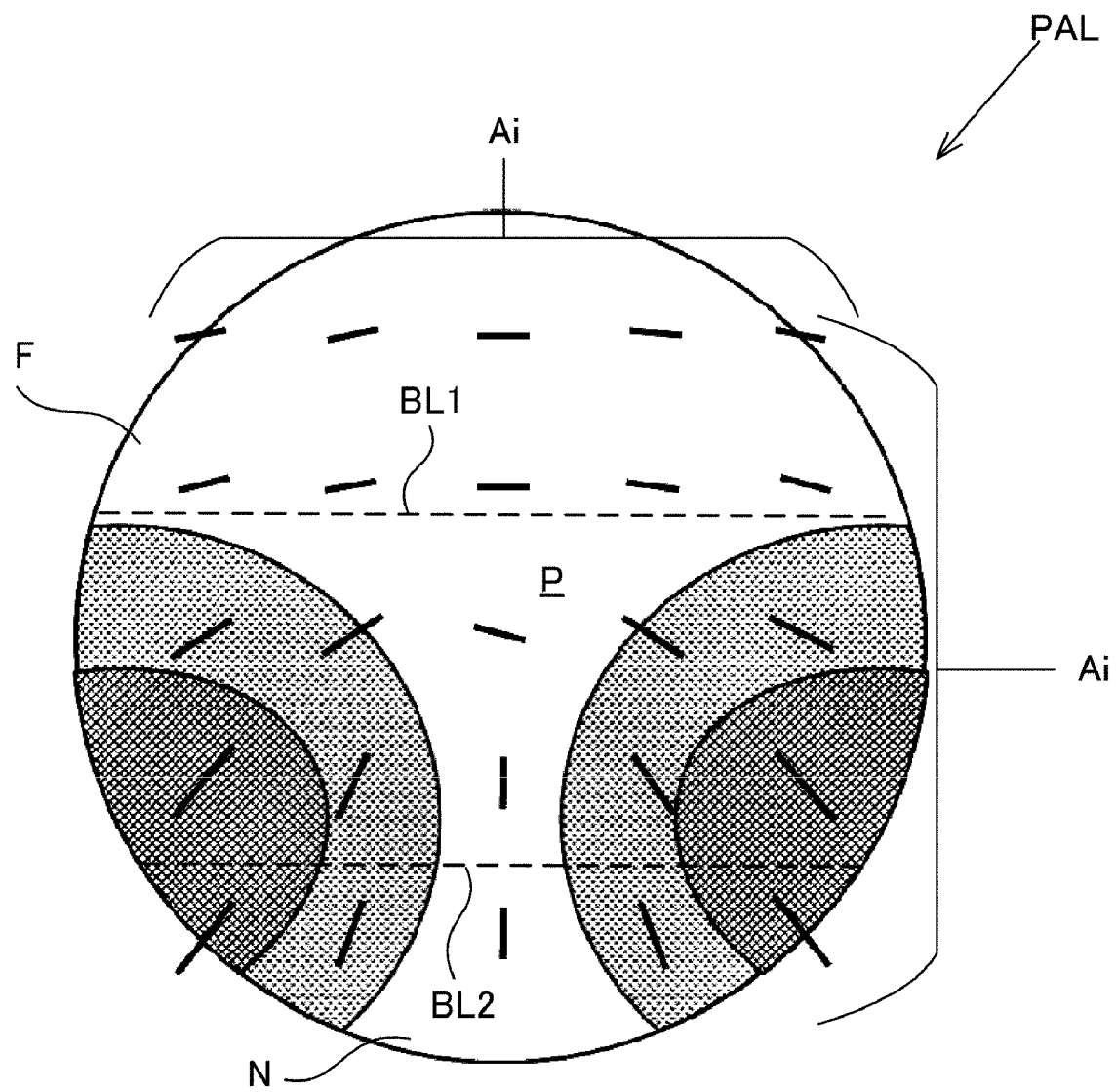
FIG. 11 is a conceptual diagram showing a direction of an axis of astigmatism in the progressive refractive power lens.

FIG. 11 is a conceptual diagram showing an axis direction of astigmatism in a progressive refractive power lens. In each of the following figures, the right and left of the ophthalmic lens correspond to the right and left viewed from a wearer when wearing the ophthalmic lens. An axis Ai of astigmatism is indicated by a line segment. A progressive refractive power lens PAL designed by a method of the present modified example includes a far portion F, an intermediate portion P, and a near portion N. A boundary line between the far portion F and the intermediate portion P is a broken line BL1, and a boundary line between the intermediate portion P and the near portion N is a broken line BL2. The direction of the axis Ai of the astigmatism at each position in the progressive refractive power lens PAL is indicated by the direction of the line segment that constitutes the axis Ai of the astigmatism indicated at the position. A region indicated by hatching is a region where the aberration is higher than that of another region, and a region where the hatching is dense indicates a larger aberration than a region where the hatching is thin.

The right direction of FIG. 11 is 0°, and the angle of the axis Ai of the astigmatism is defined counterclockwise to 180°. The direction of the axis Ai of the astigmatism is 0° or more and 30° or less, 150° or more and 180° or less, or the like in the far portion F and is 60° or more and 120° or less or the like in the near portion N.

Therefore, in an aberration sensitivity test for the design of the far portion F, it is preferable that the effective astigmatic axis angle be 0° or more and 30° or less, or 150° or more and 180° or less. Accordingly, in the aberration sensitivity test for the design of the far portion F, the target Ob can be arranged at a far distance or an intermediate distance from the wearer W, the effective astigmatic axis angle can be fixed at any angle of 0° or more and 30° or less or 150° or more and 180° or less, preferably 0° or more and 20° or less or 160° or more and 180° or less, and the effective spherical power or the effective cylindrical power can be changed from the reference state to a plurality of different values. The wearer W can view the target Ob through each lens group 70 in a plurality of states that realize each of the plurality of lens groups 70 that realize the effective spherical power or the effective cylindrical power of a plurality of different values and the effective astigmatic axis angle described above and answer whether or not the aberration is acceptable. The sensitivity information obtained by the aberration sensitivity test for the design of the far portion F is referred to as far portion sensitivity information. The far portion of the progressive refractive power lens to be designed can be designed based on the far portion sensitivity information.

In an aberration sensitivity test for the design of the near portion N, it is preferable that the effective astigmatic axis angle be 600 or more and 120° or less. Accordingly, in the aberration sensitivity test for the design of the near portion N, the target Ob can be arranged at a near distance from the wearer W, the effective astigmatic axis angle can be fixed at any angle of 60° or more and 120° or less, preferably 70° or more and 1100 or less, and the effective spherical power or the effective cylindrical power can be changed from the reference state to a plurality of different values. The wearer W can view the target Ob through each lens group 70 in a plurality of states that realize each of the plurality of lens groups 70 that realize the effective spherical power or the effective cylindrical power of a plurality of different values and the effective astigmatic axis angle described above and answer whether or not the aberration is acceptable. The sensitivity information obtained by the aberration sensitivity test for the design of the near portion N is referred to as near portion sensitivity information. The far portion of the progressive refractive power lens to be designed can be designed based on the near portion sensitivity information.

In the design method of the progressive refractive power lens in the present modified example, an astigmatic axis angle in the far portion sensitivity test and an astigmatic axis angle in the near portion sensitivity test are different from each other. In this way, when the target Ob is arranged at a plurality of different distances D and the aberration sensitivity test is performed with respect to each of the distances D, by varying the astigmatic axis angle based on the direction of the axis of the astigmatism at a portion of the ophthalmic lens for viewing the a target at a distance D, it is possible to obtain sensitivity information suitable for the design of various ophthalmic lenses.

(1) In the ophthalmic lens design method of the present modified example, with respect to each of the plurality of different distances D, with reference to the optical property of the lens group 70 when the wearer W is capable of clearly viewing the target Ob through the lens group 70, the wearer W can be made to view the target Ob through the lens group 70 in a plurality of states having the optical property of different values, and based on each distance, the astigmatic axis angle (effective astigmatic axis angle) with respect to the cylindrical power (effective cylindrical power) corresponding to the change from the reference that is given by the lens group 70 can be varied. Thereby, when there are a plurality of regions having a different application or the like in an ophthalmic lens, it is possible to provide an ophthalmic lens which suitably prevents aberration when viewing a target through each region.

(2) In the ophthalmic lens design method of the present modified example, the ophthalmic lens to be designed is the progressive refractive power lens PAL; when the right direction viewed from the wearer W is 0°, and the astigmatic axis angle is defined counterclockwise from 0° to 180°, in a case where the target Ob is arranged at the far distance or the intermediate distance from the wearer W, the far portion sensitivity information (first information) is acquired in which the astigmatic axis angle with respect to the cylindrical power (effective cylindrical power) corresponding to the change from the reference that is given by the lens group 70 is 0° or more and 30° or less or 150° or more and 180° or less, and in a case where the target Ob is arranged at the near distance from the wearer W, the near portion sensitivity information (second information) is acquired in which the astigmatic axis angle with respect to the cylindrical power corresponding to the change from the reference that is given by the lens group 70 is 60° or more and 1200 or less; and the far portion of the progressive refractive power lens is designed based on the first information, and the near portion of the progressive refractive power lens is designed based on the second information. Thereby, it is possible to provide a progressive refractive power lens which suitably prevents aberration when viewing a target through the far portion and the near portion.

Modified Example 2

The design method of the above embodiment is described using an example of setting a target aberration of a progressive refractive power lens; however, the ophthalmic lens to be designed is not particularly limited to the progressive refractive power lens. As an example, a single-focus lens can also be designed using the sensitivity information of the wearer W.

In the single-focus lens, as described later with respect to FIG. 12A and the like, the astigmatism and a spherical power error which is a deviation of the refractive power from the spherical power occur at a peripheral portion of the lens on a far side in a radial direction from an optical axis of the single-focus lens. Hereinafter, the peripheral portion of the single-focus lens to be designed in the present modified example can be a region in which the astigmatism or the spherical power error occurs to a predetermined extent. For example, the peripheral portion of the single-focus lens depends on the type of a product or the prescription but can be a region in which the sum of the absolute values of the astigmatism and the spherical power error is 0.25 D or more.

In the design method of the single-focus lens according to the present modified example, whether the spherical power error or the astigmatism is preferentially prevented is set based on the sensitivity information. In the aberration sensitivity test for obtaining this sensitivity information, a relative magnitude of the effective cylindrical power relative to the effective spherical power of the lens group 70 is changed, and an answer from the wearer W who has viewed the target Ob through the lens group 70 is acquired. Among combinations of the effective spherical power and the effective cylindrical power, a combination which is preferred by, comfortable for, or acceptable for the wearer W is defined as the sensitivity information. In this sensitivity information, instead of the combination, a relative magnitude of the effective cylindrical power relative to the effective spherical power in the combination may be represented by a ratio or the like. The format and the representation method of the sensitivity information of the present modified example are not particularly limited if to what extent which one of the spherical power error and the astigmatism is preferentially prevented is shown.

In the aberration sensitivity test according to the present modified example, the target Ob is preferably arranged at a far distance but is not limited thereto. By the control of the inspection control device 5, the optical property of the lens group 70 is adjusted such that the wearer W can clearly view the target Ob through the lens group 70. When the target Ob is arranged at the far distance, the optical property of the lens group 70 in which the wearer W is completely corrected may be set as the reference state.

In the aberration sensitivity test according to the present modified example, the effective astigmatic axis angle is fixed at an arbitrary angle, the relative magnitude of the effective cylindrical power relative to the effective spherical power is changed from an initial state of the lens group 70, and an answer of the wearer W who has viewed the target Ob in a plurality of states of the lens group 70 is acquired. For example, the effective cylindrical power can be decreased by a predetermined interval d1 selected from 0.05 D or more and 0.25 D or less, and the effective spherical power can be increased at a predetermined interval d2. Here, the values of d1 and d2 are not particularly limited, but it is preferable that d1 and d2 be positive values, and d2 be smaller than twice d1. The initial state of the lens group 70 can be a state different from the reference state and can be a state in which the effective cylindrical power is 0 [D], and the effective spherical power is Si [D] (Si is larger than 0.25) as a non-limiting example. The effective spherical power and the effective cylindrical power of the initial state of the lens group 70 may be adjusted based on the product model of the single-focus lens, the prescription of the wearer W, or the set spherical power or the set cylindrical power of the lens group 70 at the complete correction.

A combination of the effective spherical power and the effective cylindrical power that are most suitable for the wearer W or the like is acquired as the sensitivity information based on the answer of the wearer W who has viewed the target Ob through the lens group 70 in a plurality of states changed from the initial state. In the design of the single-focus lens, the spherical power error and the astigmatism in the peripheral portion of the lens can be set based on this sensitivity information.

Figure 12:
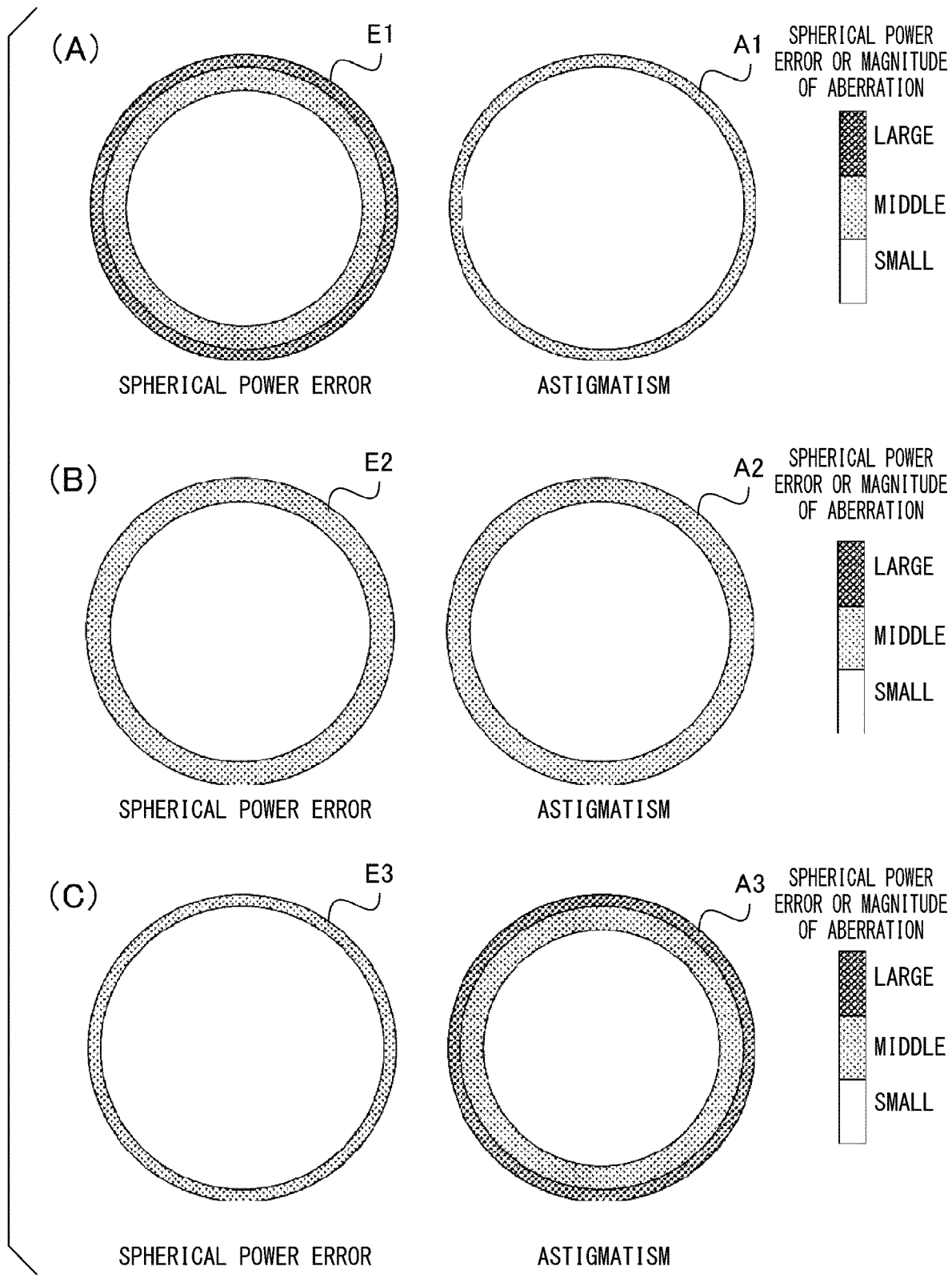
FIGS. 12, (A), (B), and (C) are conceptual diagrams showing an example of the setting of astigmatism and a spherical power error in a single-focus lens.

FIGS. 12A, 12B, and 12C are conceptual diagrams showing an example of the setting of the spherical power error and the astigmatism of a single-focus lens. In FIGS. 12A, 12B, and 12C, a distribution diagram of the spherical power error and a distribution diagram of the astigmatism are shown, and the magnitude of aberration corresponding to the pattern used in the distribution diagram is shown in the rightmost portion of the diagram.

FIG. 12A is a diagram showing an example of a design that emphasizes the astigmatism. The single-focus lens according to a distribution E1 of the spherical power error and a distribution A1 of the astigmatism in FIG. 12A is used suitably for a wearer W having a strong sensitivity of the astigmatism since the magnitude of the astigmatism is reduced. FIG. 12B is a diagram showing an example of a design that emphasizes a balance between the spherical power error and the astigmatism. The single-focus lens according to a distribution E2 of the spherical power error and a distribution A2 of the astigmatism in FIG. 12B is used suitably for a wearer W having an average sensitivity of the astigmatism since the magnitude of the astigmatism is larger than that of the example of FIG. 12A, but the spherical power error is reduced. FIG. 12C is a diagram showing an example of a design that emphasizes the spherical power. The single-focus lens according to a distribution E3 of the spherical power error and a distribution A3 of the astigmatism in FIG. 12C is used suitably for a wearer W having a weak sensitivity of the astigmatism since the magnitude of the spherical power error is reduced.

In the design method of the ophthalmic lens of the present modified example, in the sensitivity information, a combination of the effective spherical power and the effective cylindrical power suitable for the wearer W and a relative magnitude of the effective spherical power and the effective cylindrical power are shown. For example, in the storage unit 22 of the order receiving device 2, this combination or the relative magnitude is associated with distributions of a target astigmatism and a target spherical power error in the single-focus lens. The design portion 212 can design a single-focus lens having an aberration property of the peripheral portion suitable for the wearer W by selecting the distributions of the target astigmatism and the target spherical power error corresponding to the sensitivity information.

In the ophthalmic lens design method of the present modified example, the ophthalmic lens to be designed is a single-focus lens, and the single-focus lens is designed based on the relative magnitude of the cylindrical power relative to the spherical power of the lens group 70 when it is acceptable for the wearer W to view the target Ob through the lens group 70, or the combination of the spherical power and the cylindrical power. Thereby, it is possible to design a single-focus lens suitable for the wearer W based on the sensitivity of the wearer W with respect to the aberration measured with high accuracy.

Modified Example 3

In the modified example 2 described above, sensitivity information obtained by performing an aberration sensitivity test in which the effective spherical power or the effective cylindrical power is changed with respect to a predetermined effective astigmatic axis angle may be acquired, and based on this sensitivity information, a region of a single-focus lens having an axis of astigmatism in a direction corresponding to the predetermined effective astigmatic axis angle may be designed.

FIGS. 13A and 13B are conceptual diagrams showing a direction of an axis of astigmatism in a single-focus lens. FIG. 13A and FIG. 13B are conceptual diagrams showing a single-focus lens SFL1 and a single-focus lens SFL2, respectively, designed in the present modified example. A region indicated by hatching is a region where the aberration is higher than that of another region, and a region where the hatching is dense indicates a larger aberration than a region where the hatching is thin. An axis Ai1 of the astigmatism at the peripheral portion of the single-focus lens SFL1 extends in a circumferential direction in a cylindrical coordinate system in which an optical axis Ax10 of the single-focus lens SFL1 is a rotational axis. On the other hand, an astigmatic axis Ai2 at the peripheral portion of the single-focus lens SFL2 extends in a radial direction in a cylindrical coordinate system in which an optical axis Ax20 of the single-focus lens SFL2 is a rotational axis.

In this way, the axes Ai1 and Ai2 of astigmatism at the peripheral portion of the single-focus lenses SFL1 and SFL2 can take various directions in one single-focus lens. Accordingly, in the present modified example, with respect to each of a plurality of effective astigmatic axis angles, an aberration sensitivity test is performed by fixing each effective astigmatic axis angle and changing the effective spherical power and the effective cylindrical power. Based on sensitivity information obtained by the aberration sensitivity test, in the single-focus lenses SFL1 and SFL2, a region having an axis of astigmatism at an angle corresponding to each effective astigmatic axis angle is designed.

With respect to two effective astigmatism axial angles that are substantially perpendicular to each other, it is preferable that the aberration sensitivity test be performed by changing the effective spherical power and the effective cylindrical power while being fixed to each effective astigmatic axis angle, and the sensitivity information be acquired. In this case, the difference between the two effective astigmatic axis angles described above can be 45° or more, preferably 60° or more, and the two effective astigmatic axis angles described above can be an arbitrary angle that is different by about 90° from each other. For example, when the right direction is 0° when viewed from the wearer W, and the astigmatic axis angle is defined counterclockwise from 0° to 180°, the two effective astigmatic axis angles described above can be a first angle of 0° or more and 30° or less or 150° or more and 1800 or less and a second angle of 600 or more and 120° or less, and in particular, the two effective astigmatic axis angles described above can be 0° and 90°.

Figure 14:
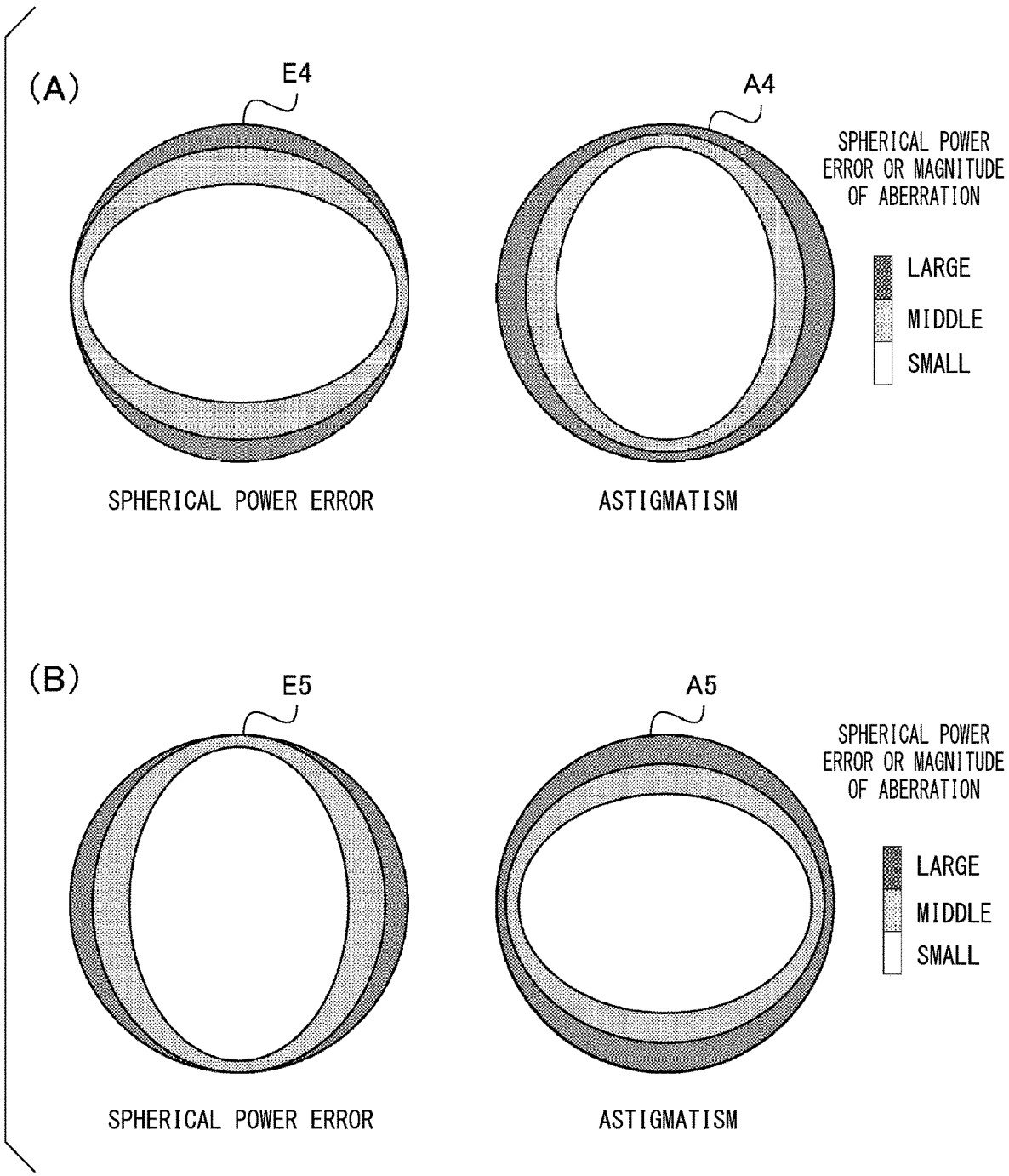
FIGS. 14, (A) and (B) are conceptual diagrams showing an example of the setting of astigmatism and a spherical power error in the single-focus lens.

FIGS. 14A and 14B are conceptual diagrams showing an example of the setting of the spherical power error and the astigmatism in the design of the single-focus lens SFL1 having an astigmatism distribution of FIG. 13A. In FIGS. 14A and 14B, a distribution diagram of the spherical power error and a distribution diagram of the astigmatism are shown, and the magnitude of aberration corresponding to a pattern used for the distribution diagram is shown in the rightmost portion of the figure.

FIG. 14A shows a distribution E4 of the spherical power error and a distribution A4 of the astigmatism when a sensitivity with respect to astigmatism having an axis in a rightward-leftward direction is stronger than a sensitivity with respect to astigmatism having an axis in an upward-downward direction. The sensitivity information about the sensitivity with respect to the astigmatism having the axes in the upward-downward direction and the rightward-leftward direction can be obtained by the aberration sensitivity test in which the effective astigmatic axis angle is fixed to 90° and 0°, respectively. Since a region that includes the astigmatism having the axis in the rightward-leftward direction to which the wearer W is sensitive is present on the upper side and the lower side of the single-focus lens SFL1 (refer to FIG. 13A), a region where the astigmatism becomes "small" is longer in the upward-downward direction compared to the rightward-leftward direction in the example of FIG. 14A.

FIG. 14B shows a distribution E5 of the spherical power error and a distribution A5 of the astigmatism when a sensitivity with respect to astigmatism having an axis in the upward-downward is stronger than a sensitivity with respect to astigmatism having an axis in the rightward-leftward direction. Since a region that includes the astigmatism having the axis in the upward-downward direction to which the wearer W is sensitive is present on the left side and the right side of the single-focus lens SFL1 (refer to FIG. 13A), a region where the astigmatism becomes "small" is longer in the rightward-leftward direction compared to the upward-downward direction in the example of FIG. 14B.

In the design of the single-focus lens SFL2 having the astigmatism distribution of FIG. 13B, the distribution becomes a distribution as shown in FIG. 14B when the sensitivity with respect to the astigmatism having the axis in the rightward-leftward direction is stronger than the sensitivity with respect to the astigmatism having the axis in the upward-downward direction. The distribution becomes a distribution as shown in FIG. 14A when the sensitivity with respect to the astigmatism having the axis in the upward-downward direction is stronger than the sensitivity with respect to the astigmatism having the axis in the rightward-leftward direction.

The aberration sensitivity test may be performed by fixing each of three or more different effective astigmatic axis angles, and a region corresponding to each effective astigmatic axis angle in the single-focus lens may be designed based on the obtained sensitivity information. The effective astigmatic axis angle in the aberration sensitivity test and an angle of an axis of astigmatism of the corresponding region need not be matched exactly with each other and may be mismatched by a few degrees to 30° or the like with each other, as appropriate.

(1) In the ophthalmic lens design method of the present modified example, with respect to the target Ob arranged at a predetermined distance D, sensitivity information when the astigmatic axis angle of the lens group 70 is a predetermined angle is acquired, and based on the sensitivity information, at least one of the spherical power error and the astigmatism at a position having at least an astigmatism in a direction corresponding to the predetermined angle in the peripheral portion of the single-focus lenses SFL1 and SFL2 is set. Thereby, it is possible to provide a single-focus lens suitable for the wearer W which is designed based on the sensitivity of the wearer W with respect to the astigmatism having axes in a plurality of different directions.

(2) In the ophthalmic lens design method of the present modified example, with reference to the optical property of the lens group 70 when the wearer W is capable of clearly viewing the target Ob through the lens group 70, the wearer W is made to view the target Ob through the lens group 70 in a plurality of states having the optical property of different values; when the right direction viewed from the wearer W is 0°, and the astigmatic axis angle is defined counterclockwise from 0° to 180°, with respect to the target Ob arranged at the predetermined distance D, the sensitivity information in each case of the first angle in which the astigmatic axis angle with respect to the cylindrical power (effective cylindrical power) corresponding to the change from the reference that is given by the lens group 70 is 0° or more and 30° or less or 150° or more and 180° or less and the second angle in which the astigmatic axis angle with respect to the cylindrical power (effective cylindrical power) corresponding to the change from the reference that is given by the lens group 70 is 60° or more and 120° or less is acquired; and based on the sensitivity information, at least one of the spherical power error and the astigmatism of the peripheral portion of the single-focus lenses SFL1 and SFL2 is set. Thereby, it is possible to provide a single-focus lens suitable for the wearer W which is designed based on the sensitivity of the wearer W with respect to the astigmatism having each of the axis in the rightward-leftward direction and the axis in the upward-downward direction.

Modified Example 4

The above embodiment is described using an example in which the effective spherical power, the effective cylindrical power, and the effective astigmatic axis angle are transmitted to the reflector 6, and the set spherical power, the set cylindrical power, and the set astigmatic axis angle are calculated in the calculation portion 621. However, a configuration may be employed in which the set spherical power, the set cylindrical power, and the set astigmatic axis angle are calculated on the inspection control device 5 side and are transmitted to the reflector 6. If the desired effective spherical power, the desired effective cylindrical power, and the desired effective astigmatic axis angle are realized by the lens group 70, a subject or the like that performs a calculation process of these numerical values is not particularly limited. A program for controlling the optical property of the lens group 70 may be executed on the reflector 6 side.

The present invention is not limited to the contents of the embodiments described above. Other embodiments that are conceivable within the technical scope of the present invention are also included in the scope of the present invention.

What is claimed is:

1. A sensitivity evaluation method, comprising:
   causing a target to be viewable, to a wearer, through a lens or a lens group enabled to control at least one optical property among a spherical power, a cylindrical power, and an astigmatic axis angle;

acquiring information about a sensitivity of the wearer with respect to an aberration; and wherein, with respect to each of a plurality of different distances, with reference to the at least one optical property of the lens or the lens group based on the wearer being able to view the target through the lens or the lens group, a right direction viewed from the wearer being 0° and the astigmatic axis angle being defined counterclockwise from 0° to 180°, in a case where the target is arranged at a far distance or an intermediate distance from the wearer, acquiring the information about the sensitivity of a far portion of a progressive refractive power lens in which the astigmatic axis angle of the cylindrical power corresponding to a change from the reference that is given by the lens or the lens group is 0° or more and 30° or less or 150° or more and 180° or less.

2. The sensitivity evaluation method according to claim 1, wherein in the lens or the lens group, at least one of the spherical power, the cylindrical power, and the astigmatic axis angle is arbitrarily changeable at a predetermined interval.

3. The sensitivity evaluation method according to claim 2, wherein the lens or the lens group is controlled by a program, and at least one of the spherical power, the cylindrical power, and the astigmatic axis angle is changed in an order determined by the program.

4. The sensitivity evaluation method according to claim 2, wherein the predetermined interval with respect to the spherical power and the cylindrical power is smaller than 0.25 D.

5. The sensitivity evaluation method according to claim 1, wherein the target is viewable to the wearer through the lens or the lens group in a plurality of states having an optical property of different values with reference to the at least one optical property of the lens or the lens group based on the wearer being able to clearly view the target through the lens or the lens group.

6. The sensitivity evaluation method according to claim 1, wherein the information about the sensitivity is information about whether the wearer is able to view the target through the lens or the lens group.

7. The sensitivity evaluation method according to claim 1, wherein in the lens or the lens group, at least one of the spherical power, the cylindrical power, and the astigmatic axis angle is arbitrarily changeable by an electric control or a mechanical control.

8. An ophthalmic lens design method, comprising:
designing an ophthalmic lens based on the information about the sensitivity of the wearer with respect to the aberration, the information being acquired by the sensitivity evaluation method according to claim 1.

9. The sensitivity evaluation method according to claim 1, wherein the information acquired about the sensitivity of the far portion is first information, and the sensitivity evaluation method comprises:
in a case where the target is arranged at a near distance from the wearer, acquiring second information about the sensitivity of a near portion of the progressive refractive power lens in which the astigmatic axis angle of the cylindrical power corresponding to a change from the reference that is given by the lens or the lens group is 60° or more and 120° or less.

10. The ophthalmic lens design method according to claim 8,
wherein the ophthalmic lens is a single-focus lens, and the single-focus lens is designed based on a relative magnitude of the cylindrical power relative to the spherical power of the lens or the lens group based on the wearer being able to view the target through the lens or the lens group, or a combination of the spherical power and the cylindrical power.

11. The ophthalmic lens design method according to claim 10,
wherein with respect to the target arranged at a predetermined distance, information about the sensitivity based on the astigmatic axis angle of the lens or the lens group is being a predetermined angle is acquired, and
based on the information, at least one of a spherical power error and an astigmatism at a position having at least an astigmatism in a direction corresponding to the predetermined angle in a peripheral portion of the single-focus lens is set.

12. The ophthalmic lens design method according to claim 10,
wherein, with reference to the at least one optical property of the lens or the lens group based on the wearer being able to clearly view the target through the lens or the lens group, the target is viewable to the wearer through the lens or the lens group in a plurality of states having the optical property of different values;
wherein a right direction viewed from the wearer is 0°, and the astigmatic axis angle is defined counterclockwise from 0° to 180°,
with respect to the target arranged at a predetermined distance, information about the sensitivity in each case of a first angle in which the astigmatic axis angle of the cylindrical power corresponding to a change from the reference that is given by the lens or the lens group is 0° or more and 30° or less or 150° or more and 180° or less and a second angle in which the astigmatic axis angle of the cylindrical power corresponding to a change from the reference that is given by the lens or the lens group is 60° or more and 120° or less is acquired; and
based on the information, at least one of a spherical power error and an astigmatism of a peripheral portion of the single-focus lens is set.

13. An ophthalmic lens manufacturing method, comprising:
manufacturing an ophthalmic lens designed by the ophthalmic lens design method according to claim 8.

14. An ophthalmic lens which is designed by the ophthalmic lens design method according to claim 8.

15. An ophthalmic lens ordering device, comprising:
an input unit that inputs information about a sensitivity of a wearer with respect to an aberration, the information being acquired by the sensitivity evaluation method according to claim 1; and
a transmission unit that transmits the information input via the input unit or a design parameter calculated based on the information to an ophthalmic lens order receiving device.

16. An ophthalmic lens order receiving device, comprising:
a reception unit that receives information about a sensitivity of a wearer with respect to an aberration, the information being acquired by the sensitivity evaluation method according to claim 1, or a design parameter calculated based on the information; and
a design unit that designs an ophthalmic lens based on the information or the design parameter.

17. An ophthalmic lens order receiving/ordering system, comprising:
- the ophthalmic lens ordering device according to claim 16; and
- the ophthalmic lens order receiving device, comprising:
  - a reception unit that receives the information transmitted from the ophthalmic lens ordering device, or the design parameter, and
- a design unit that designs an ophthalmic lens based on the information or the design parameter.

* * * * *